US011647820B2

(12) United States Patent
Zuo

(10) Patent No.: US 11,647,820 B2
(45) Date of Patent: May 16, 2023

(54) TELESCOPIC ROD, STEERING DEVICE AND ELECTRIC LUGGAGE BOX

(71) Applicant: CHANGZHOU MOBEN INTELLIGENT TECHNOLOGY CO., LTD., Changzhou (CN)

(72) Inventor: Yiyi Zuo, Changzhou (CN)

(*) Notice: Subject to any disclaimer, the term of this patent is extended or adjusted under 35 U.S.C. 154(b) by 474 days.

(21) Appl. No.: 16/829,096

(22) Filed: Mar. 25, 2020

(65) Prior Publication Data

US 2020/0305570 A1 Oct. 1, 2020

(30) Foreign Application Priority Data

Mar. 26, 2019 (CN) .......................... 201910234044.3
May 24, 2019 (CN) .......................... 201910437965.X

(51) Int. Cl.
*A45C 13/26* (2006.01)
*A45C 5/14* (2006.01)
*A45C 9/00* (2006.01)

(52) U.S. Cl.
CPC .............. *A45C 13/262* (2013.01); *A45C 5/14* (2013.01); *A45C 2009/005* (2013.01); *A45C 2013/267* (2013.01)

(58) Field of Classification Search
CPC ... A45C 13/262; A45C 5/14; A45C 2009/005; A45C 2013/267; A45C 13/04;
(Continued)

(56) References Cited

U.S. PATENT DOCUMENTS 3,316,993 A 5/1967 Weitzner
5,459,908 A * 10/1995 Chen ....................... B62B 1/125
280/655
(Continued)

FOREIGN PATENT DOCUMENTS

CN 207346021 U 5/2018
CN 108308817 A 7/2018
(Continued)

OTHER PUBLICATIONS

CN109043772A: English Translation (Year: 2018).*
Extended European Search Report received in corresponding EP application No. 20165939.8, dated Aug. 5, 2020, 13 pages.

*Primary Examiner* — Jennifer Robertson
*Assistant Examiner* — Justin Caudill
(74) *Attorney, Agent, or Firm* — Verrill Dana, LLP; Robert L. Hover

(57) ABSTRACT

The present disclosure relates to a telescopic rod, a steering device and an electric luggage box. The telescopic rod comprises a hollow first tube, a second tube sleeved outside the first tube and being slidable relatively to the first tube, a positioning mechanism configured to lock and unlock the first tube in position relative to the second tube, and a control member configured to control the positioning mechanism to lock and unlock in position, wherein the positioning mechanism comprises a pushrod connected to the control member and movable in the first rube, an abutment unit provided at a bottom end of the pushrod, and a positioning unit adapted for being abutted by the abutment unit for locking and unlocking in position; the first tube has a limiting structure provided therein, for limiting a space for movement of the abutment unit. The steering device comprises a handle and the afore-mentioned telescopic rod connected to the handle. The electric luggage box comprises a ridable box body, a front wheel and a rear wheel mounted on the box body, and the afore-mentioned steering device for steering the front wheel.

18 Claims, 28 Drawing Sheets

(58) Field of Classification Search
CPC .............. A45C 13/36; A45C 2005/037; A45C 2005/148; B62J 9/10; B62K 2204/00; B62K 21/22; B62K 15/00; B62M 6/65; B62M 7/12
See application file for complete search history.

(56) References Cited

U.S. PATENT DOCUMENTS

| | | | | |
|---|---|---|---|---|
| 5,584,097 | A * | 12/1996 | Lu | A45C 5/14 |
| | | | | 280/655 |
| 5,704,725 | A * | 1/1998 | Horing | A45C 13/262 |
| | | | | 280/655 |
| 6,223,391 | B1 * | 5/2001 | Kuo | A45C 13/262 |
| | | | | 190/115 |
| 6,347,432 | B1 * | 2/2002 | Kuo | A45C 13/262 |
| | | | | 16/113.1 |
| 7,207,085 | B1 * | 4/2007 | Chen | A45C 13/262 |
| | | | | 16/113.1 |
| 8,282,113 | B2 * | 10/2012 | Veal | B62K 15/006 |
| | | | | 280/47.131 |
| 9,629,430 | B1 * | 4/2017 | Getahun | A45C 5/03 |
| 10,086,895 | B1 * | 10/2018 | Melamed | B62K 15/006 |
| 2006/0225981 | A1 * | 10/2006 | Lin | A45C 13/262 |
| | | | | 16/113.1 |
| 2013/0068579 | A1 * | 3/2013 | Mathieu | A45C 13/262 |
| | | | | 190/115 |
| 2015/0247831 | A1 * | 9/2015 | Lewis | A45C 13/28 |
| | | | | 455/566 |
| 2016/0255928 | A1 | 9/2016 | O'Donnell et al. | |
| 2016/0339984 | A1 * | 11/2016 | Li | A45C 9/00 |
| 2017/0127783 | A1 * | 5/2017 | Korey | H02J 7/0045 |
| 2018/0035771 | A1 * | 2/2018 | Pickavance | B62K 13/08 |
| 2018/0281882 | A1 | 10/2018 | Melamed | |

FOREIGN PATENT DOCUMENTS

| | | |
|---|---|---|
| CN | 109043772 A | 12/2018 |
| CN | 208550268 U | 3/2019 |

\* cited by examiner

TELESCOPIC ROD, STEERING DEVICE AND ELECTRIC LUGGAGE BOX

CROSS-REFERENCE TO RELATED APPLICATIONS

The present application claims priority of Chinese Patent Application No. 201910234044.3 filed on Mar. 26, 2019 and Chinese Patent Application No. 201910437965.X filed on May 24, 2019. Both applications are incorporated herein by reference in their entireties for all purposes.

TECHNICAL FIELD

The present disclosure relates to a telescopic rod, particularly relates to a telescopic rod able to lock its telescopic state, and further relates to a steering device using the telescopic rod and an electric luggage box mounted with the steering device.

BACKGROUND

Telescopic rods are rods that can be elongated or shortened according to user requirements. As a mechanical accessory, telescopic rods are widely assembled in various products, such as glass cleaners, twig trimmers, clothes racks, cellphone selfie poles, luggage boxes, scooters, bicycles, etc.

The telescopic rod in prior art comprises a first rod body and a second rod body with hollow structures, and a sleeving fastener nested between the first rod body and the second rod body. By adjusting the sleeving fastener, a user can fix the telescopic length of the first rod body relative to the second rod body.

There is a type of telescopic rod with its sleeving fastener placed inside the hollow space of the rod body, this type of telescopic rod usually comprises a control mechanism for controlling the sleeving fastener in position. For example, a telescopic pull rod of a luggage box has a control mechanism mounted inside the hollow space of the pull rod and abutting a controlled part of the sleeving fastener, and when a use presses a control button on a handle of the pull rod, an action force is transmitted through a control rod of the control mechanism, which can lock and unlock the first rod body in position relative to the second rod body, so as to facilitate the user elongating or shortening the length of the pull rod. However, the control rod mounted inside the hollow space of the rod body only has its upper end connected to the handle of the pull rod, that is to say, the relative position of the control rod inside the rod body is in an unstable state, and the control rod tends to sway inside the pull rod, which may renders the control rod unable to accurately abut the controlled part of the sleeving fastener and consequently reduces the controllability of this type of telescopic rod.

In order to solve this technical problem, the existing pull rod manufacturers make developments to enlarge the abutting area of the abutting end of the control rod and make the abutting area to approach the cross-sectional area of the pull rod, such that the abutting end of the control rod fills the entire cross-sectional area of the pull rod, so as to improve the accuracy of the control rod abutting the controlled part of the sleeving fastener. This kind of technical structure can only apply to a pull rod structure with a controlled part protruding from its sleeving fastener. But when the pull rod structure has a controlled part recessed into its sleeving fastener, the control rod with an enlarged abutting area can only abut the top end surface of the sleeving fastener and cannot abut the controlled part which is recessed into the sleeving fastener. Thus, this kind of control rod with an enlarged abutting area is not good enough in practical use.

A luggage box comprises a box body, a pull rod and wheels. A user pulls or pushes the luggage box to move by using the pull rod. However, if a lot of objects are placed in the luggage box or the user pulls the luggage box for a long time during use, it consumes a lot of physical power of the user.

The electric luggage box in prior arts comprises a box body, a steering device mounted on a front side of the box body, a steering wheel mounted on the steering device, a battery, power wheels, a controller for controlling the power wheels to rotate, and a manipulation device mounted on the steering wheel and communicationally connected to the controller. A user can ride on the box body and drive the electric luggage box by operating the manipulation device, which saves physical power of the user. However, the steering device situated outside the box body adds to the volume of the electric luggage box, and it is inconvenient to put away the electric luggage box.

SUMMARY

A technical problem to be solved by the present disclosure is that the control rod of the telescopic rod in prior art cannot accurately abut the controlled part of the sleeving fastener.

In order to solve the above technical problem, the present disclosure provides the following technical solution: a telescopic rod comprises a hollow first tube, a second tube sleeved outside the first tube and being slidable relatively to the first tube, a positioning mechanism configured to lock and unlock the first tube in position relative to the second tube, and a control member configured to control the positioning mechanism to lock and unlock in position, wherein the positioning mechanism comprises a pushrod connected to the control member and movable in the first rube, an abutment unit provided at a bottom end of the pushrod, and a positioning unit adapted for being abutted by the abutment unit for locking and unlocking in position; the first tube has a limiting structure provided therein, for limiting a space for movement of the abutment unit.

In comparison with the prior arts, the telescopic rod of the present disclosure has the following beneficial effects: the telescopic rod of the present disclosure has an abutment unit provided at the bottom end of the pushrod and adapted to abut the positioning unit, the abutment unit is controlled by the control member through the pushrod, so as to control the positioning unit to lock and unlock in position, thereby locking and unlocking the abutment unit in position relative to the second tube; the first tube has a limiting structure provided therein for limiting a space for movement of the abutment unit, the limiting structure limits the movement direction of the pushrod and the abutment unit in the first tube, so that the abutment unit is able to accurately abut the positioning unit, thereby improving the controllability of the telescopic rod.

Preferably, the limiting structure is a guide convex rib provided on an inner wall of the first tube and extending along a longitudinal direction of the first tube.

Preferably, two guide convex ribs are provided, with the space for movement of the abutment unit formed between the two guide convex ribs.

Preferably, the positioning mechanism also comprises a linkage unit mounted on a top end of the pushrod and connected to the control member, and both the linkage unit and the abutment unit are movable in the space for movement along the guide convex rib.

Preferably, the telescopic rod comprises a conductive wire passing through the first tube and the second tube.

Preferably, the conductive wire extends outside the space for movement in the first tube.

Preferably, the first tube is provided with a positioning seat for mounting the positioning unit, and a through-hole for the conductive wire to pass through is provided in the positioning seat.

Preferably, the positioning seat and a tube wall of the first tube have pin holes correspondingly disposed thereon, a U-shaped clamping band is provided on a periphery of the first tube, and fixing pins are provided on a wall of the U-shaped clamping band for inserting into the pin holes.

The present disclosure also provides a steering device comprising a handle and the afore-mentioned telescopic rod connected to the handle. wherein the handle is mounted on the first tube.

Preferably, the control member is mounted on the handle.

Preferably, the handle comprises a tube mounting part, a left grip and a right grip, the control member is an elastic button mounted on the tube mounting part, with a pressing end thereof protruding out of the tube mounting part.

Another technical problem to be further solved by the present disclosure is the electric luggage box in prior art is inconvenient to put away.

In order to solve the above technical problem, the present disclosure provides the following technical solution: An electric luggage box comprises a ridable box body, a front wheel and a rear wheel mounted on the box body, and the afore-mentioned steering device for steering the front wheel, wherein the box body has a bottom wall, a top wall, a front wall and a back wall, the front wall and the back wall respectively interconnect the top wall and the bottom wall, an accommodation space is formed between the top wall, the bottom wall, the front wall and the back wall, the bottom wall of the box body is provided with a fastening seat within the accommodation space for mounting the front wheel; the steering device is arranged to pass through the top wall and is connected to the front wheel.

In comparison with the prior arts, the electric luggage box of the present disclosure has the following beneficial effects: the interior of the electric luggage box of the present disclosure has a fastening seat for mounting the front wheel, and the steering device passes through the top wall of the box body and is connected to the front wheel mounted on the fastening seat, so that the steering device is mounted in the interior of the box body, thereby reducing the volume of the electric luggage box; furthermore, the front wheel connected to the steering device is mounted on the bottom wall of the box body, which can also reduce the front-rear dimension of the electric luggage box in comparison with the design of arranging the front wheel on a front side of the box body as in prior art, so the volume of the electric luggage box can be correspondingly reduced; this also makes it easy to put away the electric luggage box.

Preferably, the handle is provided with a manipulation device communicationally connected to a controller mounted inside the box body, and the manipulation device is connected to the controller via a conductive wire passing through the first tube and the second tube.

Preferably, a steering connector member is mounted on the fastening seat for connecting to the front wheel, and the steering device is connected to the front wheel through the steering connector member.

Preferably, the steering connector member comprises an upright rod for steering the front wheel, the fastening seat comprises an upright tube sleeved outside the upright rod, and the upright rod is rotatably connected to the upright tube through a bearing.

Preferably, the telescopic rod of the steering device is fixedly connected to the upright rod of the steering connector member, the telescopic rod is provided with a turn-limiting slide slot for limiting the turn around an axis of the telescopic rod, and the upright tube is provided with a turn-limiting member extending into the turn-limiting slide slot.

Preferably, the upright rod is arranged to pass through the upright tube, a nesting block sleeved on the upright rod is provided at a bottom end of the second tube, the nesting block is mounted in a tubular space of the second tube and fixedly connected to the second tube, and the upright rod is fixedly connected to the nesting block; a fixing bush sleeved on an exterior of the second tube is provided at a top end of the second tube, and the fixing bush is mounted on the top wall of the box body.

Preferably, the box body comprises a ring frame formed by the top wall, the front wall, the bottom wall and the back wall connected head-to-tail, a first cover and a second cover are respectively mounted on both lateral sides of the ring frame, and the fastening seat and the steering device are mounted on the ring frame.

Preferably, the ring frame is a ring bracket formed by strip metal plates joined head-to-tail and bent into a ring.

Preferably, the ring frame is connected to an axle fastening member for mounting two rear wheels, and the two rear wheels are respectively mounted on both sides of the axle fastening member.

Preferably, the ring frame comprises a main body in the middle of the ring frame, and a first edge part and a second edge part on both sides of the main body, both the first edge part and the second edge part flare and protrude from the main body; two ends of the axle fastening member are respectively fixedly connected to the first edge part and the second edge part, and a support member is provided between a middle part of the axle fastening member and the main body.

Preferably, the main body comprises a straight segment and a waved segment arranged next to one another, the waved segment having a wall thickness less than that of the straight segment.

DETAILED DESCRIPTION OF EMBODIMENTS

Hereinafter, specific embodiments of the present disclosure are described in detail with reference to the appended Drawings, which is not intended to limit the protection scope of the present disclosure. Terms such as "front", "rear", "left", "right", "above", "below", "top", "bottom" refer to the orientation or positional relationship based on the illustration of the appended drawings, and are only for the purpose of facilitating and simplifying the description of the present disclosure, rather than indicating or implying that the apparatus or component referred to must have a particular orientation or must be configured or operated in a particular orientation, therefore should not be construed as a limitation towards the present disclosure. In addition, terms such as "first", "second" are merely for simplifying the description and distinguishing from similar objects, and should not be construed as indicating a specific order or a precedence relation thereof.

Figure 1:
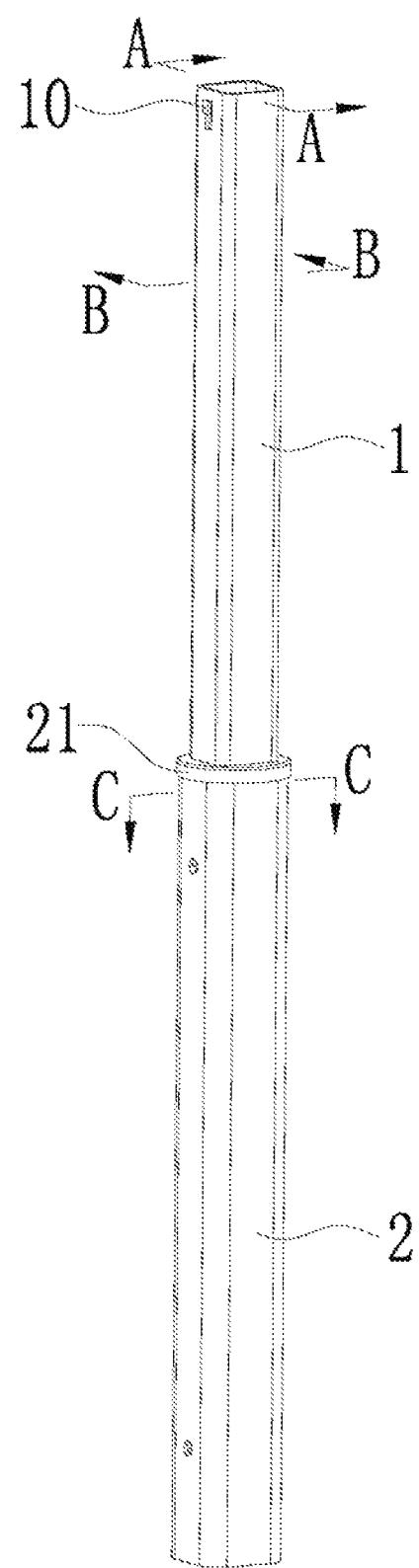
FIG. 1 is a perspective view of a telescopic rod of the present disclosure.
Figure 2:
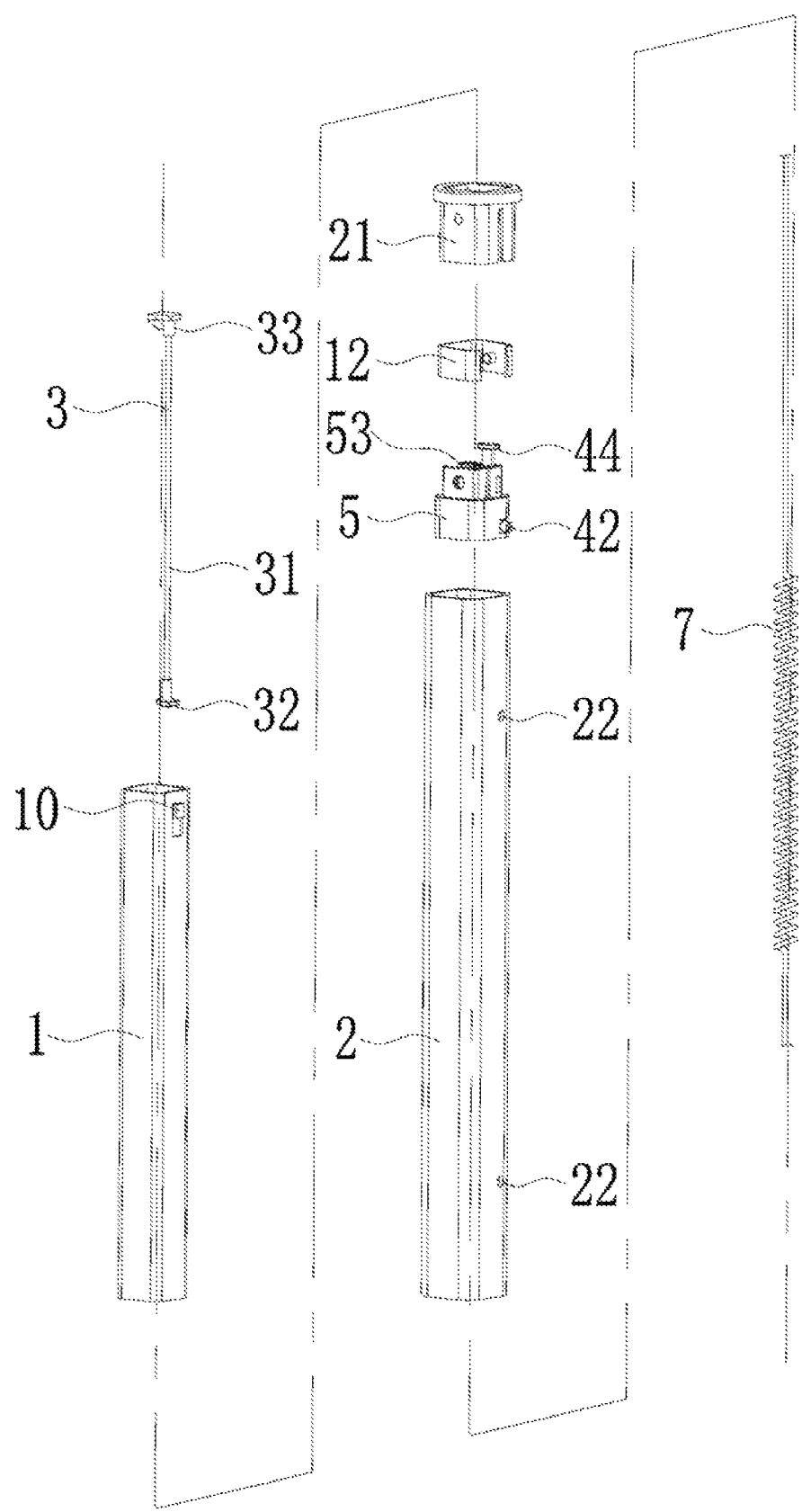
FIG. 2 is an exploded view of the telescopic rod of the present disclosure.

Referring to FIG. 1 and FIG. 2, this embodiment provides a telescopic rod, which comprises a first tube 1, a second tube 2 sleeved outside the first tube 1 and being slidable relatively to the first tube 1, a positioning mechanism 3 configured to lock and unlock the first tube 1 in position relative to the second tube 2, and a control member 10 configured to control the positioning mechanism 3 to lock and unlock in position. By operating the control member 10, the first tube 1 can be locked or unlocked in position relative to the second tube 2, thereby realizing the stretching and retracting function of the telescopic rod. The telescopic rod can be assembled in products such as glass cleaners, twig trimmers, clothes racks, cellphone selfie poles, luggage boxes, scooters, bicycles, etc.

Figure 3:
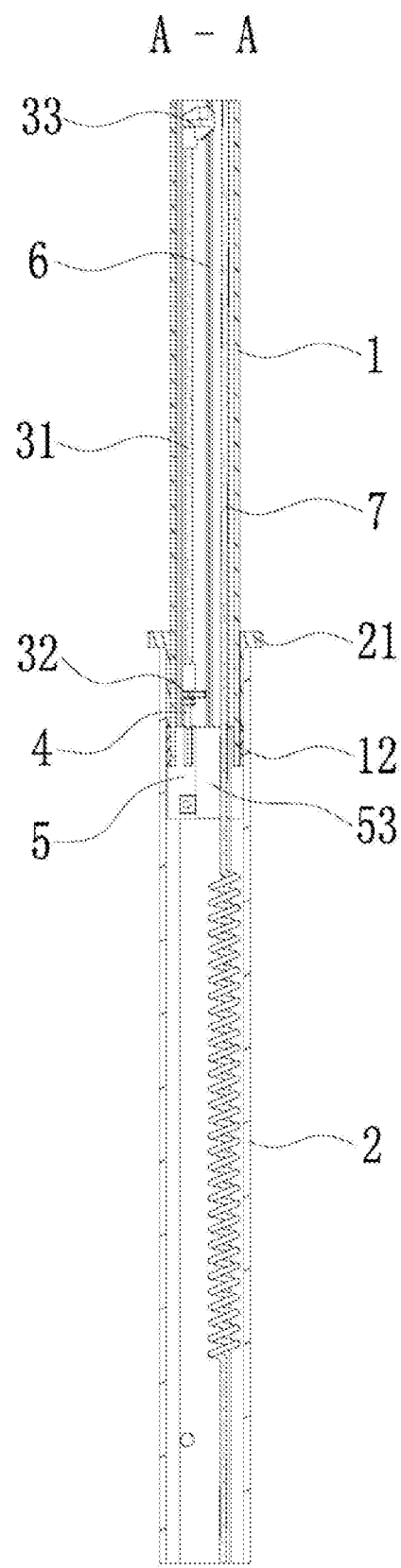
FIG. 3 is a sectional view along the A-A line in FIG. 1.

Referring to FIG. 2 and FIG. 3, in this embodiment, the first tube 1 and the second tube 2 both have hollow tubular structures. The hollow tubular space of the first tube 1 and the second tube 2 has a cross-section of a circular shape, an oval shape or a polygonal shape. The polygonal shape may be a triangle, a quadrangle or a pentagon, wherein the specific number of edges of the polygonal shape may be set according to actual needs. In this embodiment, the hollow cross-section of the tubular structure has a quadrangle shape, so as to guide the telescopic movement direction of the first tube 1 relative to the second tube 2 and constrain any rotation of the first tube 1 relative to the second tube 2. A clearance fit is provided between the first tube 1 and the second tube 2. A tube bush 21 is provided in the gap between the first tube 1 and the second tube 2. The tube bush 21 is fixed at a top end of the second tube 2 and situated between the first tube 1 and the second tube 2. The second tube 2 is sleeved on a periphery of the first tube 1. The tube bush 21 can reduce the contact area between the first tube 1 and the second tube 2, so that the friction is reduced and the relative sliding performance is improved; it also prevents an outer wall of the first tube 1 from scoring an inner wall of the second tube 2; and in a stretched state of the telescopic rod, it also reduces the swaying of the first tube 1 relative to the second tube 2.

Referring to FIG. 2 and FIG. 3, in this embodiment, the control member 10 is mounted on the first tube 1 at a position corresponding to the controlled end of the positioning mechanism 3. The control member 10 can be operated manually by a user or by an electronic switch, so as to control the positioning mechanism 3 to lock and unlock in position. Of course, in other embodiments, the control member 10 may also be mounted on the second tube 2, while adjusting the control manner and the assembling structure of the positioning mechanism 3 in a corresponding way. Also, when the telescopic rod is assembled in a product, the control member 10 may also be mounted at a control handle of the corresponding product, for example, a gripping handle of a cellphone selfie pole. The telescopic rod in this embodiment will be described in detail in accordance with a structure of the control member 10 being mounted on the first tube 1 and the control manner thereof.

Referring to FIG. 2 and FIG. 3, in this embodiment, the positioning mechanism 3 comprises a pushrod 31 connected to the control member 10 and movable inside the first tube 1, an abutment unit 32 provided at a bottom end of the pushrod 31, and a positioning unit 4 adapted for being abutted by the abutment unit 32 for locking and unlocking in position. The first tube 1 is provided with a positioning seat 5 for mounting the positioning unit 4. The positioning seat 5 is mounted at a bottom end of the first tube 1, so it is easy to assemble the positioning seat 5 on the first tube 1.

Figure 4:
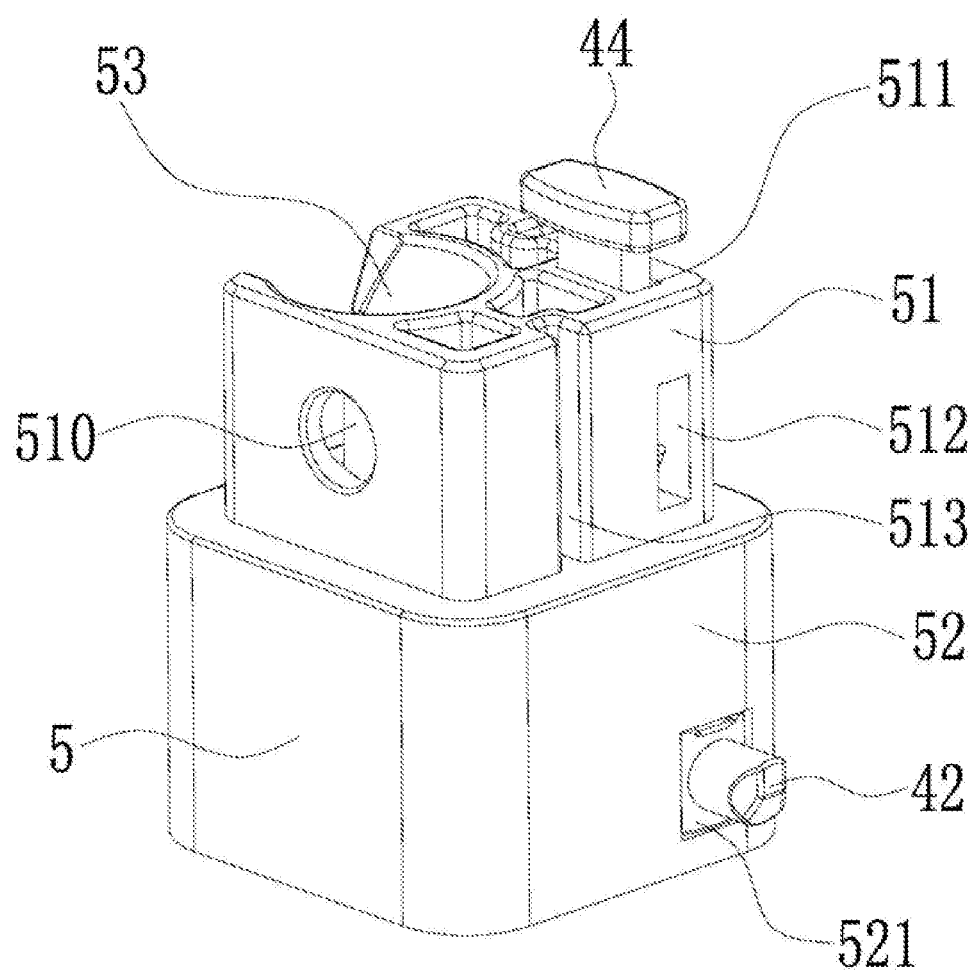
FIG. 4 is a perspective view of a positioning seat in the present disclosure.
Figure 5:
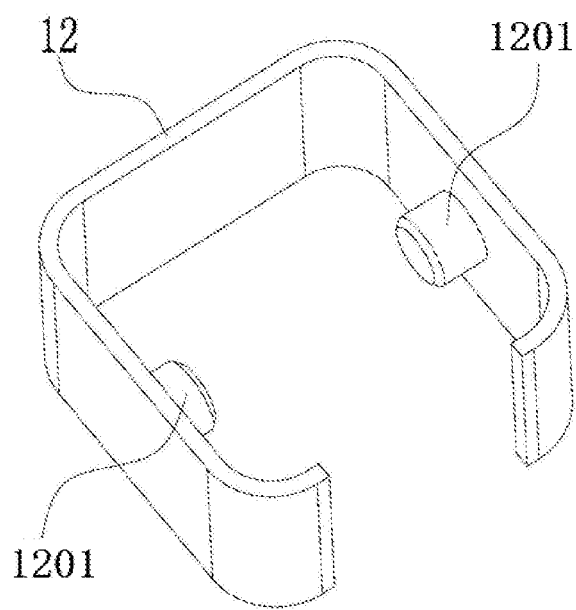
FIG. 5 is a perspective view of a U-shaped clamping band in the present disclosure.

Referring to FIG. 3 to FIG. 5, the positioning seat 5 comprises an upper seat body 51 and a lower seat body 52. The upper seat body 51 of the positioning seat 5 is inserted in the tubular space of the first tube 1. The area occupied by the positioning seat 5 with respect to the first tube 1 is the cross-sectional area of the tubular space of the first tube 1. The positioning seat 5 and a tube wall of the first tube 1 have pin holes 510 correspondingly disposed thereon for cooperating with pins to form a fixed connection. A U-shaped clamping band 12 is provided on a periphery of the first tube 1 and sleeved on the first tube 1. The U-shaped clamping band 12 is situated between the first tube 1 and the second tube 2. Fixing pins 1201 are provided on a wall of the U-shaped clamping band 12 for inserting into the pin holes 510. The fixing pins 1201 make the positioning seat 5 be fixedly connected to the first tube 1, thereby increasing the mounting firmness of the positioning seat 5. The lower seat body 52 is exposed out of the first tube 1 and situated on a lower side of the first tube 1. The lower seat body 52 is mounted in the tubular space of the second tube 2 in a cooperative way. The positioning seat 5 is fixedly connected to the first tube 1 through the U-shaped clamping band 12, which makes the positioning seat 5 easy to assemble and disassemble, and the mounting difficulty level is reduced. Of course, in other embodiments, the positioning seat 5 may also be mounted in part of the tubular space of the first tube 1 (i.e., the area occupied by the positioning seat 5 with respect to the first tube 1 is part of the cross-sectional area of the tubular space of the first tube 1), and may be fixedly connected to the first tube 1 by a fastener. Also, the mounting location of the positioning seat 5 may be between the top end and the bottom end of the first tube 1, according to technological requirements of the telescopic rod, that is to say, the positioning seat 5 may be mounted completely within the tubular space of the first tube 1.

Figure 6:
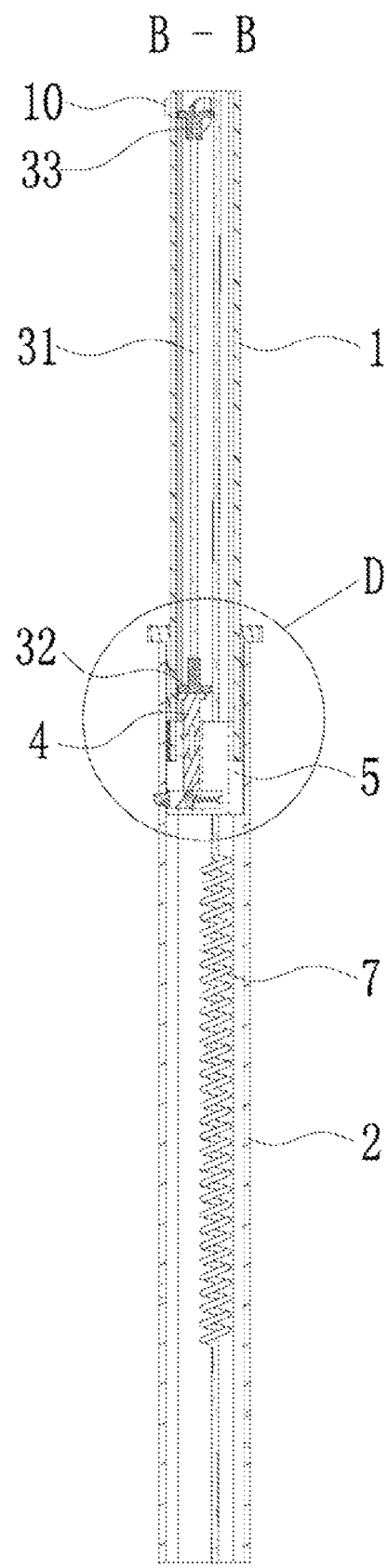
FIG. 6 is a sectional view along the B-B line in FIG. 1.
Figure 7:
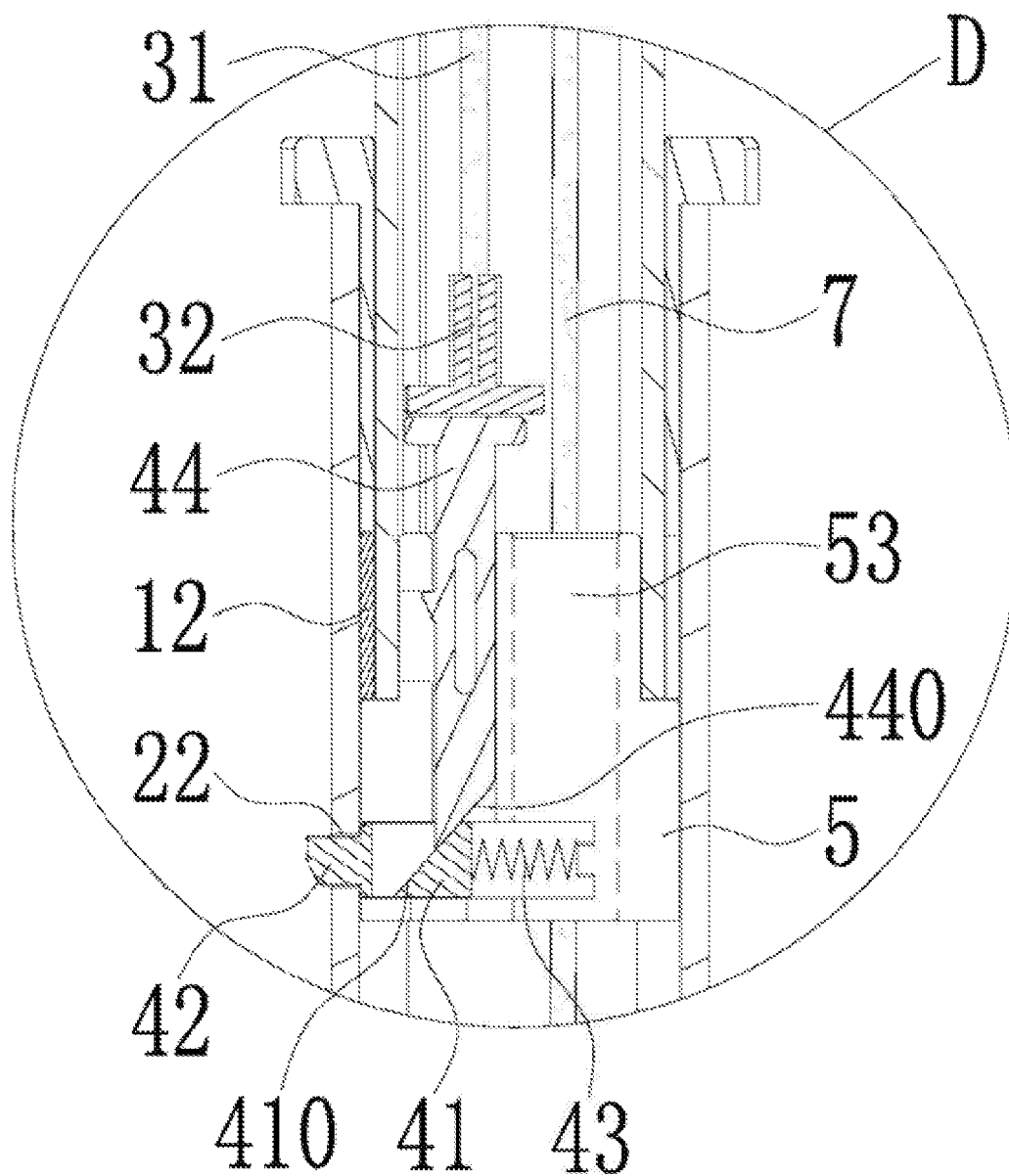
FIG. 7 is a partial enlarged view of the part D in FIG. 6.

Referring to FIG. 4, FIG. 6 and FIG. 7, in this embodiment, the interior of the positioning seat 5 is provided with a cavity for partially accommodating the positioning unit 4. The positioning unit 4 comprises a sliding block 41 mounted in the cavity of the positioning seat 5, a position-limiting pin 42 protruding from one end of the sliding block 41 and slidable together with the sliding block 41, a resilient member 43 connected to the other end of the sliding block 41 and pressing on the sliding block 41, and a pressing holder 44 extending into the cavity of the positioning seat 5 to press on the sliding block 41 and control the sliding block 41 to slide. The resilient member 43 adopts a compression spring. The abutment unit 32 abuts the pressing holder 44 and controls the pressing holder 44 to downwardly press on the sliding block 41 to control the position-limiting pin 42 to move. The upper seat body 51 of the positioning seat 5 is provided with a first opening 511 for the pressing holder 44 to extend into the cavity of the positioning seat 5. The end of the pressing holder 44 abutting the abutment unit 32 protrudes out of the positioning seat 5; and the other end of the pressing holder 44 pressing on the sliding block 41 is arranged to pass through the first opening 511 and extend downwards. The position-limiting pin 42 protruding from the sliding block 41 is situated in the lower seat body 52 of the positioning seat 5, and the positioning seat 5 is provided with a second opening 521 for the position-limiting pin 42 to extend out of the positioning seat 5. A tube wall of the second tube 2 has position-limiting holes 22 to cooperate with the position-limiting pin 42. When the position-limiting pin 42 is inserted into a position-limiting hole 22, the first tube 1 can be locked in position relative to the second tube 2; on the contrary, when the position-limiting pin 42 is pulled out of the position-limiting hole 22, the position of the first tube 1 relative to the second tube 2 can be unlocked. By controlling the sliding position of the position-limiting pin 42 relative to the positioning seat 5, the telescopic position of the first tube 1 relative to the second tube 2 can be regulated. There may be two position-limiting holes 22 (as shown in FIG. 2). The two position-limiting holes 22 arranged in an upper location and a lower location can respectively define the telescopic positions of the first tube 1 relative to the second tube 2 of the telescopic rod in a stretched state and in a retracted state.

Referring to FIG. 6 and FIG. 7, in this embodiment, the sliding block 41 has a first sliding angular surface 410 pressed on by the pressing holder 44. The pressing end of the pressing holder 44 has a second sliding angular surface 440 to cooperate with the first sliding angular surface 410 in a sliding manner. By the slidable cooperation between the two sliding angular surfaces, a corresponding relative movement can be effected between the sliding block 41 and the pressing holder 44. The control member 10, through the pushrod 31, pushes the abutment unit 32 to move in the first tube 1, wherein the pushrod 31 transmits a pressing force applied from the control member 10 to the pressing holder 44. When a user presses the control member 10, a force is applied to the pressing holder 44 through the pushrod 31, the pressing holder 44 moves downward, and as the second sliding angular surface 440 abuts the first sliding angular surface 410, the sliding block 41 can thereby be moved towards an inner side of the positioning seat 5, and at the same time the position-limiting pin 42 follows the sliding block 41 to move towards the inner side of the positioning seat 5 (at this time, the compression spring is in a compressed state), so that the position-limiting pin 42 is pulled out of the position-limiting hole 22 and thus the position of the first tube 1 relative to the second tube 2 becomes unlocked, then, the user can pull the first tube 1 up and down to change the telescopic position of the first tube 1 relative to the second tube 2. When the user stops applying the force on the pressing holder 44 (i.e., the pressing force of the pushrod 31 is relieved), the compression spring mounted in the cavity of the positioning seat 5 is released, so the resilient stretching force of the spring presses the sliding block 41 to slide towards the outer side of the positioning seat 5, the first sliding angular surface 410 of the sliding block 41 oppositely abuts the second sliding angular surface 440 of the pressing holder 44 to cause the pressing holder 44 to move upward, the position-limiting pin 42, together with the sliding block 41, moves towards the outer side of the positioning seat 5 and then abuts an inner wall of the second tube 2. When the position-limiting pin 42 follows the first tube 1 and is moved to a position of another position-limiting hole 22 on the second tube 2, the compressed compression spring is further released, and the resilient stretching force of the compression spring causes the position-limiting pin 42 to insert into this another position-limiting hole 22, so as to realize the positioning of the first tube 1 relative to the second tube 2, such that the position of the first tube 1 relative to the second tube 2 is locked in another telescopic position.

Figure 8:
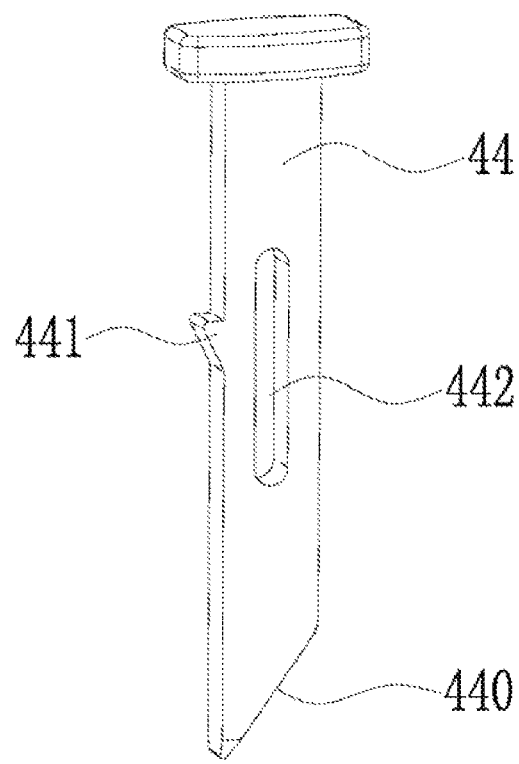
FIG. 8 is a perspective view of a pressing holder in the present disclosure.

Referring to FIG. 4, FIG. 7 and FIG. 8, in this embodiment, in order to prevent the pressing holder 44 from being separated from the first opening 511 when the pressing holder 44 moves up and down relative to the first opening 511, a side surface of the pressing holder 44 is provided with a wedge 441 for unidirectional downward guide-in. The interior of the cavity of the positioning seat 5 is provided with a sliding space 512 to accommodate the wedge 441 to move up and down, wherein the up-and-down movement distance of the wedge 441 is limited by the height of the sliding space 512, so that the pressing holder 44 can be prevented from being separated from the first opening 511. The pressing holder 44 is made of plastics and has an elongated hole 442. The position of the wedge 441 corresponds to the location of the elongated hole 442. When mounting the pressing holder 44, the operator compresses the waist part of the pressing holder 44 at the elongated hole 442 to the middle, causing the part of the pressing holder 44 with the elongated hole 442 to deform, so the wedge 441 on the side surface of the pressing holder 44 is easily pressed into the sliding space 512, thereby facilitating the mounting of the pressing holder 44. The first opening 511 has a guide chamfer to facilitate the mounting of the wedge 441, so that the mounting efficiency of the pressing holder 44 is further increased, and the pressing holder 44 is easy to mount.

Figure 9:
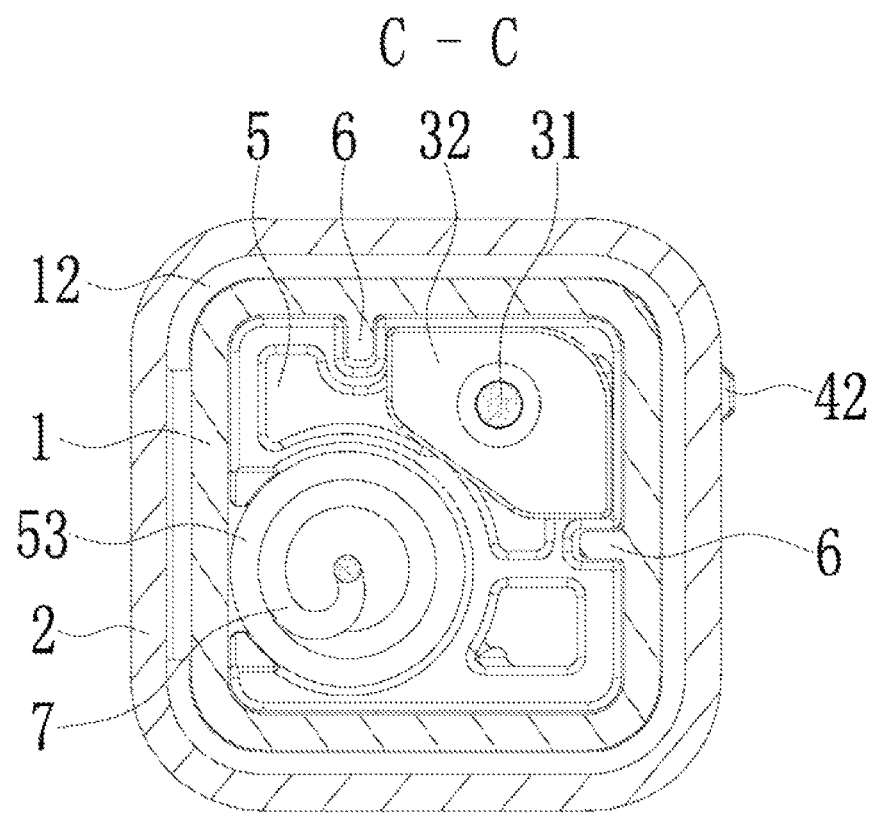
FIG. 9 is a sectional view along the C-C line in FIG. 1.

Referring to FIG. 3 and FIG. 9, in this embodiment, the first tube 1 has a limiting structure 6 provided therein for limiting a space for movement of the abutment unit 32. The limiting structure 6 delimits the movement direction of the pushrod 31 and the abutment unit 32 within the first tube 1, and makes the abutment unit 32 able to accurately abut the pressing holder 44 of the positioning unit 4, so as to control the positioning unit 4 to lock and unlock in position, thereby locking and unlocking the first tube 1 in position relative to the second tube 2, and the controllability of the telescopic rod is improved. Of course, in other embodiments, when the controlled end of the pressing holder 44 is recessed into the positioning seat 5, the abutment unit 32 can also extend into the part of the positioning seat 5 with the pressing holder 44 recessed therein, and can also accurately abut the pressing holder 44.

In this embodiment, the limiting structure 6 is a guide convex rib provided on an inner wall of the first tube 1 and extending along a longitudinal direction of the first tube 1. There are two guide convex ribs respectively situated on inner walls of two adjacent sides of the quadrangle tubular body. The abutment unit 32 is situated on one side in the tubular space of the first tube 1, and relies on the two guide convex ribs to delimit its movement direction. The space for movement of the abutment unit 32 is formed between the two guide convex ribs. This space for movement delimits the movement direction of the abutment unit 32, and when the control member 10 pushes the abutment unit 32 to move within this space for movement, it is ensured that the abutment unit 32 can accurately abut the pressing holder 44.

Figure 10:
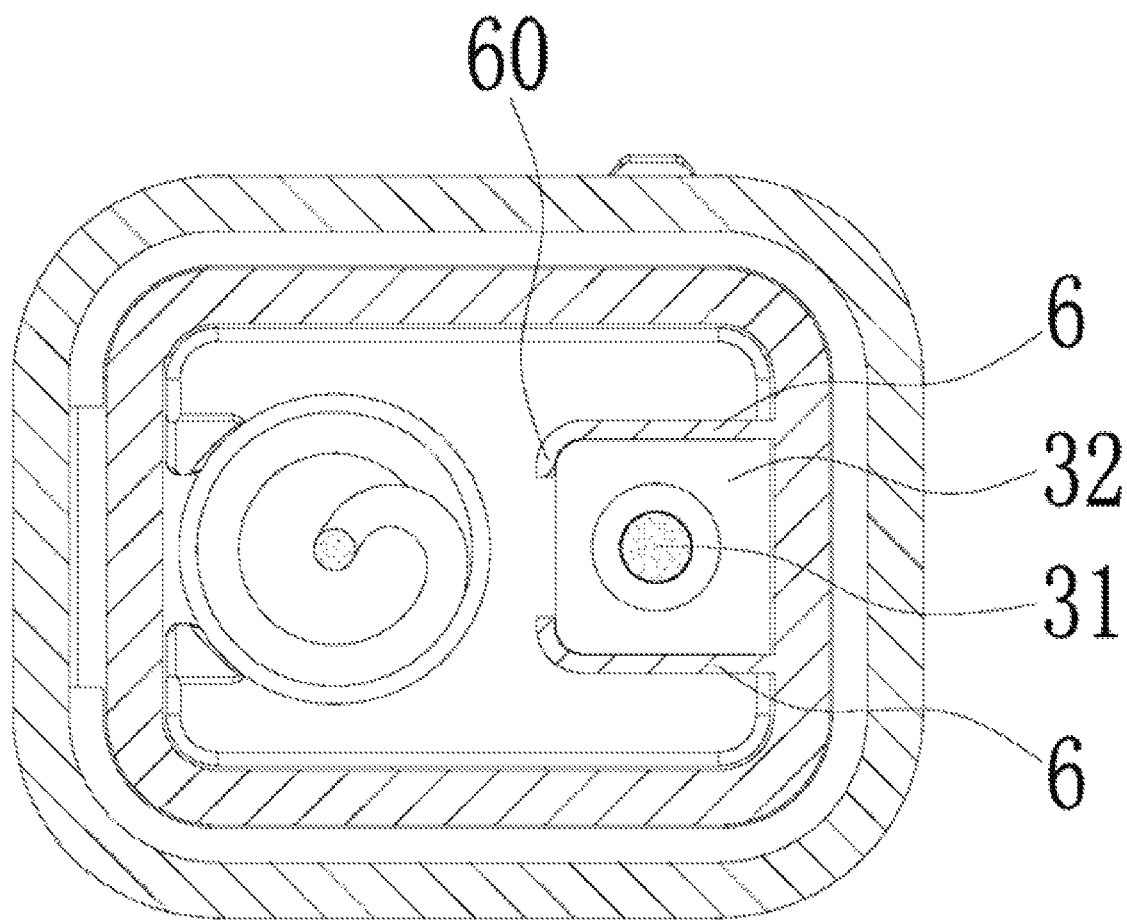
FIG. 10 is a mounting view of the abutment unit and the positioning unit of another embodiment.

Referring to FIG. 10, in another embodiment, the two guide convex ribs are arranged on a tube wall of the same side surface of the first tube 1. The ends of the two guide convex ribs have claws 60 extending oppositely, and the space for movement of the abutment unit 32 is formed between the two guide convex ribs. By providing the oppositely extending claws 60, the two guide convex ribs can be arranged on a tube wall of the same side surface to delimit the movement direction of the abutment unit 32. Of course, there may be only one guide convex rib, and under such circumstances, the guide convex rib having the claw 60 may cooperate with a tube wall to together surround the abutment unit 32, and the space for movement of the abutment unit 32 is formed between the tube wall and the guide convex rib having the claw 60.

Figure 11:
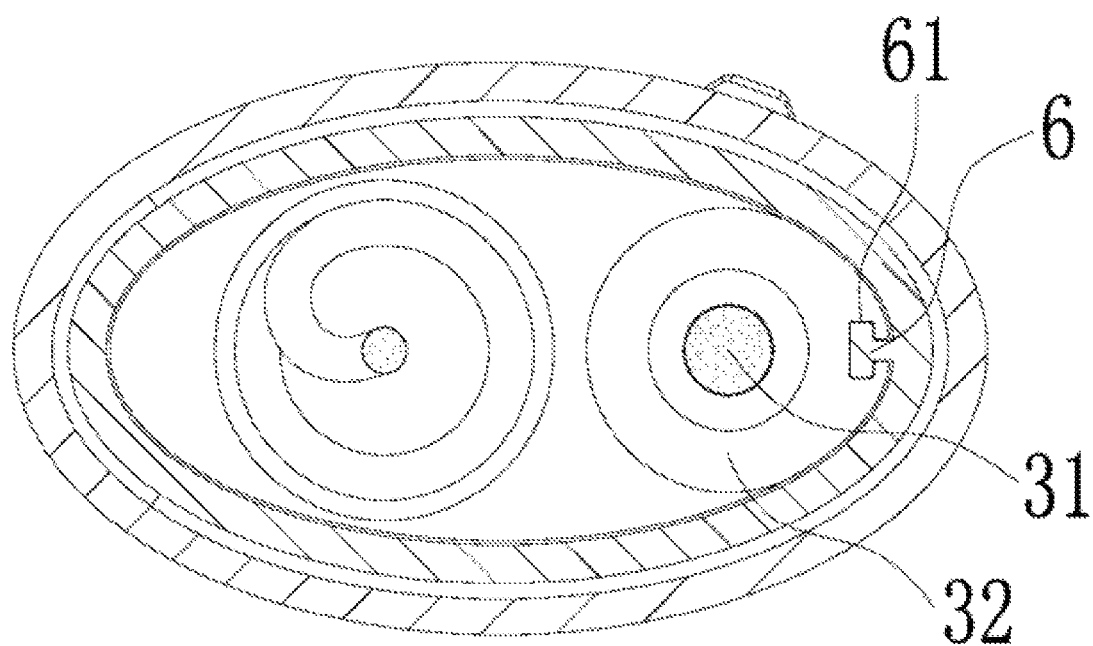
FIG. 11 is a mounting view of the abutment unit and the positioning unit in a further embodiment.

Referring to FIG. 11, in a further embodiment, there is only one guide convex rib. This guide convex rib is a T-shaped slide rail, and the abutment unit 32 has a slide groove 61 to cooperate with the T-shaped slide rail. The movable space of the abutment unit 32 sliding along the T-shaped slide rail constitutes the space for movement of the abutment unit 32. The abutment unit 32 moves along the T-shaped slide rail within the first tube 1, and thus can accurately abut the pressing holder 44. Of course, like the movement mode of the abutment unit sliding along a T-shaped slide rail, a guide groove extending in the longitudinal direction of the first tube may be provided on an inner wall of the first tube 1, and a guide slide block cooperating with the guide groove may by correspondingly provided on the abutment unit 32, so that the abutment unit 32 can move along the guide groove within the first tube 1. In this embodiment, the limiting structure is understood to be the T-shaped slide rail or the guide groove extending in the longitudinal direction of the first tube.

Referring to FIG. 2 and FIG. 3, in this embodiment, the positioning mechanism 3 also comprises a linkage unit 33 mounted on a top end of the pushrod 31 and connected to the control member 10. The linkage unit 33 and the abutment unit 32 are situated on the same side in the first tube 1 and between the two guide convex ribs. Both the linkage unit 33 and the abutment unit 32 are movable in the space for movement along the two guide convex ribs, which is beneficial for linking the pushrod 31 to the control member 10 so as to transmit the pushing force from the control member 10. Also, the two guide convex ribs extend to the bottom end of the first tube 1, and the upper seat body 51 of the positioning seat 5 has clamping groves 513 (as shown in FIG. 4) to cooperate with the guide convex ribs, thereby increasing the mounting firmness of the positioning seat 5 to the first tube 1.

Referring to FIG. 2 and FIG. 3, in this embodiment, the telescopic rod comprises a passing-through member 7 arranged to pass through the first tube 1 and the second tube 2. The passing-through member 7 is arranged along the longitudinal direction of the telescopic rod. Both the first tube 1 and the second tube 2 have holes for the passing-through member 7 to be led out of the telescopic rod, so as for the passing-through member 7 to be connected to a corresponding device. The part of the passing-through member 7 in the first tube 1 has a straight-ling shape, and at least a portion of the part of the passing-through member 7 in the second tube 2 has an elastic spiral shape, so as to cooperate with the telescopic rod in the stretched state and the retracted state.

It should be noted that, when the telescopic rod is mounted in different products, the passing-through member 7 adopts a corresponding accessory. For example: when the telescopic rod is mounted in a glass cleaner, the passing-through member 7 is a flexible hose; of course when the brush part of the glass cleaner has an electric motor, the passing-through member 7 also comprises a conductive wire. When the telescopic rod is mounted in a cellphone selfie pole, the passing-through member 7 is a conductive wire connected to a cellphone. When the telescopic rod is mounted in a twig trimmer, the passing-through member 7 is a pull rope connected to the trimmer; and when the twig trimmer is electrically driven, the passing-through member 7 is a conductive wire connected to an electric saw mounted on a top end. The telescopic rod may be applied in many scenes, which are not described one by one herein.

In this embodiment, the space for movement of the abutment unit 32 delimits the movement direction of the pushrod 31 and the abutment unit 32 within the first tube 1, which means the pushrod 31 and the abutment unit 32 can be prevented from swaying in the first tube 1. The part of the passing-through member 7 in the first tube 1 is independently arranged in the first tube 1, and would not become entangled with the pushrod 31 or the abutment unit 32, which means the passing-through member 7 extends outside the afore-said space for movement in the first tube 1, so the service life of the passing-through member is prolonged. It should be noted that, when the telescopic rod is mounted with a passing-through member 7 therein, the limiting structure 6 delimiting the space for movement of the abutment unit 32 in the first tube 1 not only can allow the abutment unit 32 to accurately abut the positioning unit 4, but also can prevent entangling between the abutment unit 32, the pushrod 31 and the passing-through member 7.

Referring to FIG. 2 and FIG. 3, in this embodiment, the positioning seat 5 has a through-hole 53 for the passing-through member 7 to pass through. The passing-through member 7 passes through the through-hole 53 and extends in both the first tube 1 and the second tube 2. By providing the through-hole 53 in the positioning seat 5 for the passing-through member 7 to pass through, the mounting of the passing-through member 7 is made easy. Of course, in other embodiments, when the positioning seat 5 only partially occupies the cross-sectional area of the tubular body, the passing-through member 7 may directly pass through the first tube 1 and the second tube 2.

Figure 12:
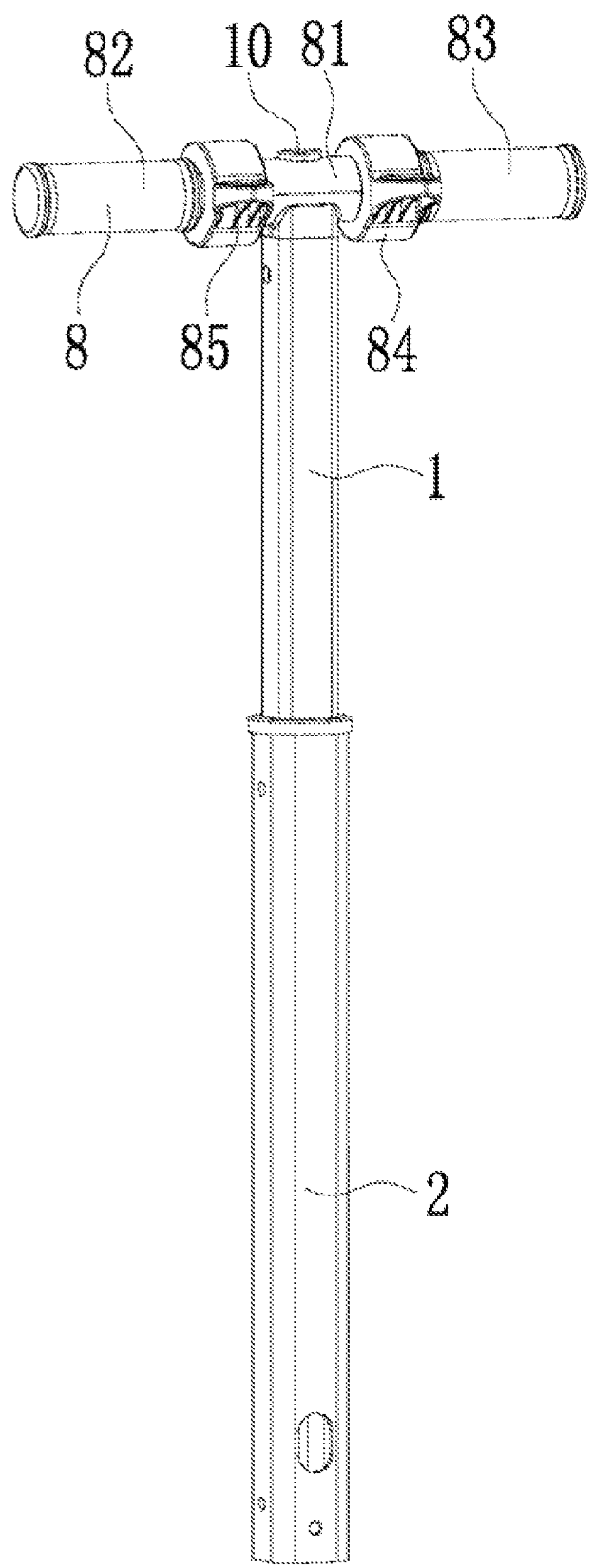
FIG. 12 is a perspective view of a steering device equipped with the telescopic rod in the present disclosure.

Referring to FIG. 12, the present disclosure also provides a steering device, which comprises a handle 8 and the afore-mentioned telescopic rod connected to the handle 8. A conductive wire connected to the handle 8 is mounted inside the telescopic rod. The handle 8 is mounted on the first tube 1. Of course, in other embodiments, according to requirements of use, the handle 8 may also be mounted on the second tube 2. The steering device may be applied in traffic tools such as scooters, bicycles, elderly vehicles, etc. The telescopic steering device is beneficial for the user to adjust the operating height of the handle 8, thereby facilitating users with different body builds to operate the steering device. When the handle 8 is adjusted to a minimal height, it is beneficial for the user to put away the corresponding traffic tool, as it saves the storage space.

In this embodiment, the handle 8 comprises a tube mounting part 81, a left grip 82 and a right grip 83, the control member 10 for controlling the positioning mechanism 3 to lock and unlock in position is mounted on the tube mounting part 81. A controlled end of the linkage unit 33 of the positioning mechanism 3 extends upward to the tube mounting part 81 so as to be connected to the control member 10. The control member 10 is an elastic button mounted on the tube mounting part 81, with a pressing end of the elastic button protruding out of the tube mounting part 81, thereby facilitating the stretching or retracting of the telescopic rod by a user. Of course, in other embodiments, the control member 10 may also be mounted on the telescopic rod, without adversely affecting the usable height of the telescopic rod by a user. It should be noted that, the definition of the handle 8 should be broadly construed, and the handle 8 may also be an annular steering wheel.

Figure 13:
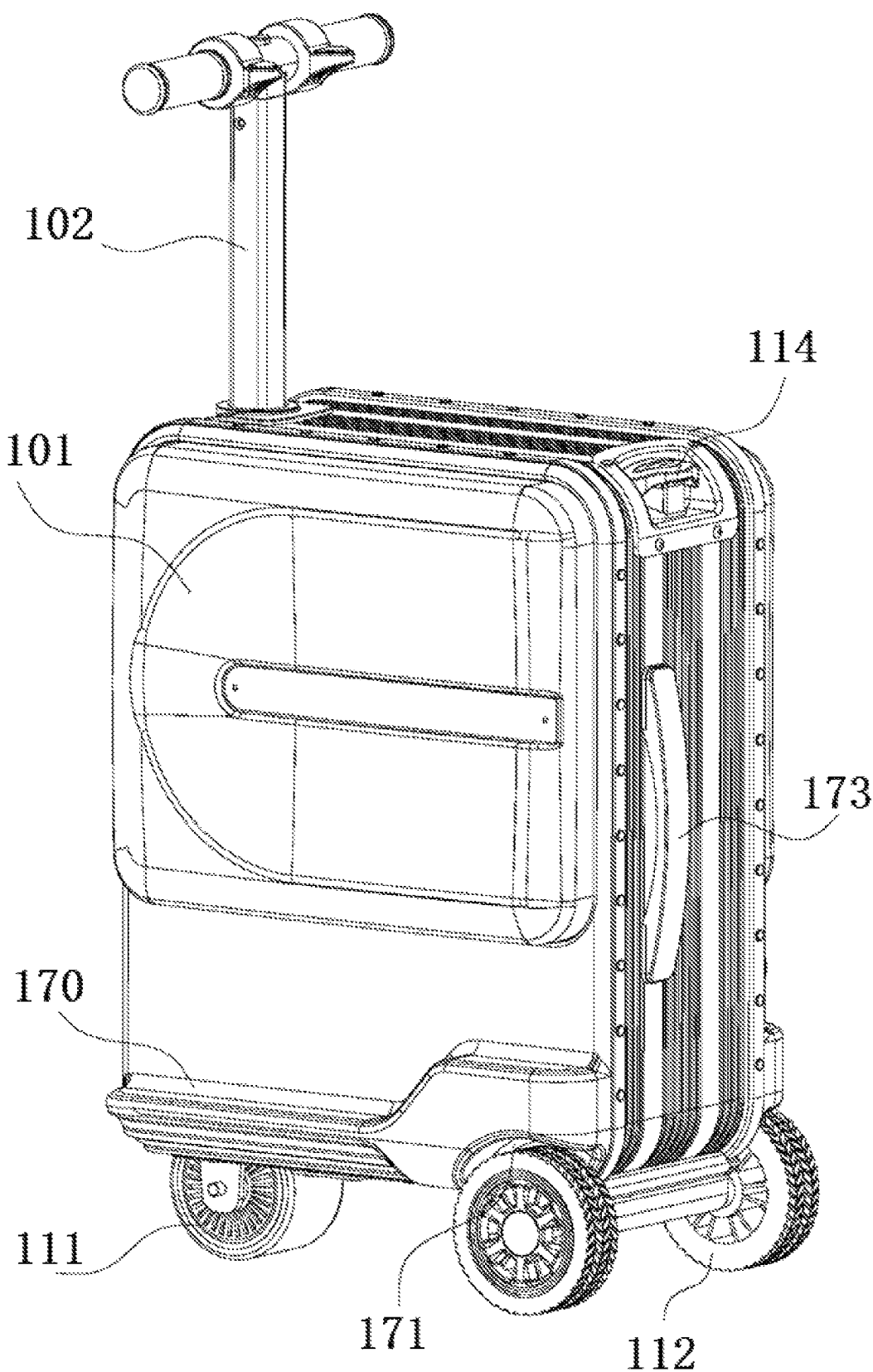
FIG. 13 is a perspective view of an electric luggage box of the present disclosure.
Figure 14:
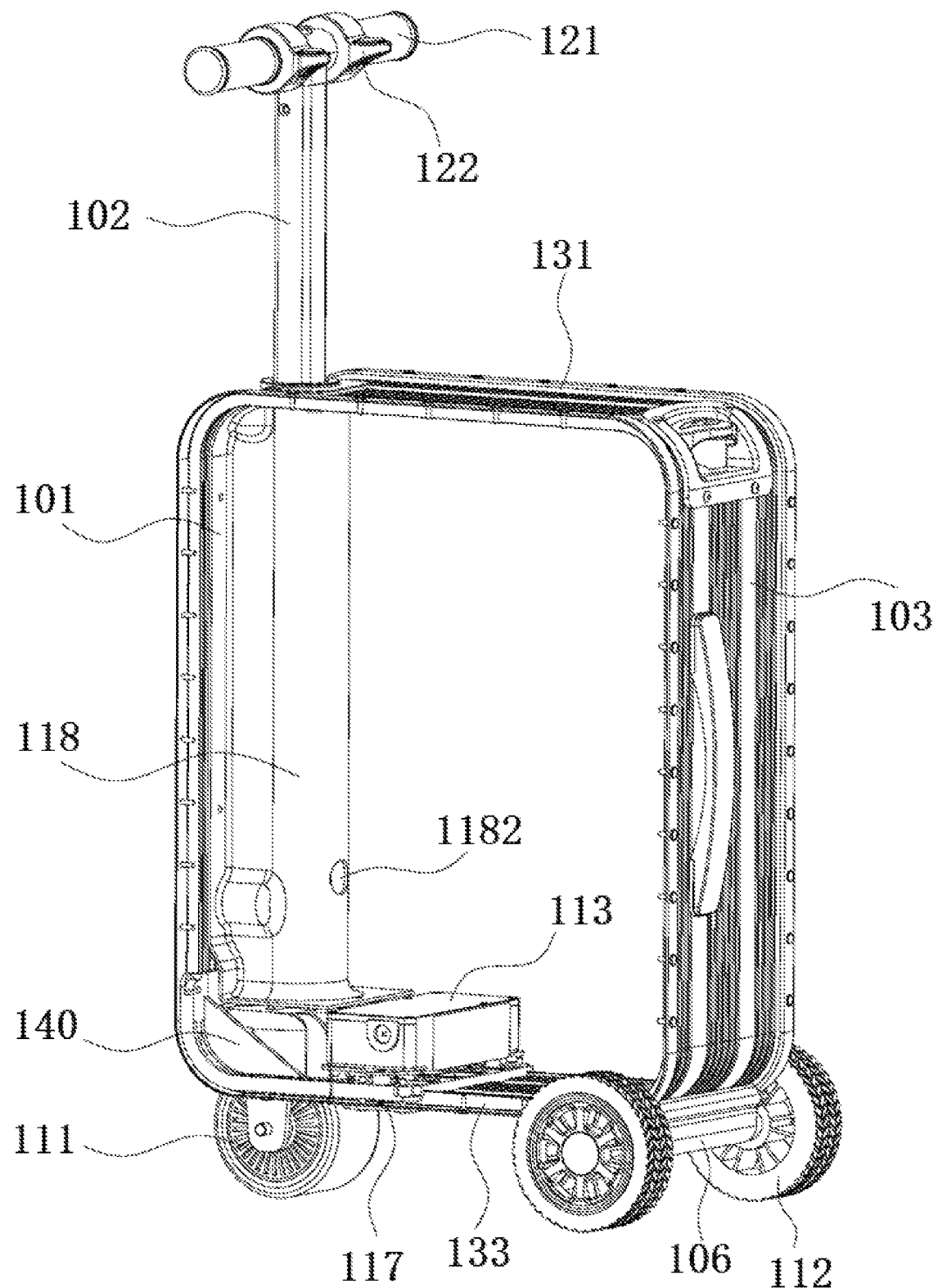
FIG. 14 is an internal view of the electric luggage box of the present disclosure.
Figure 15:
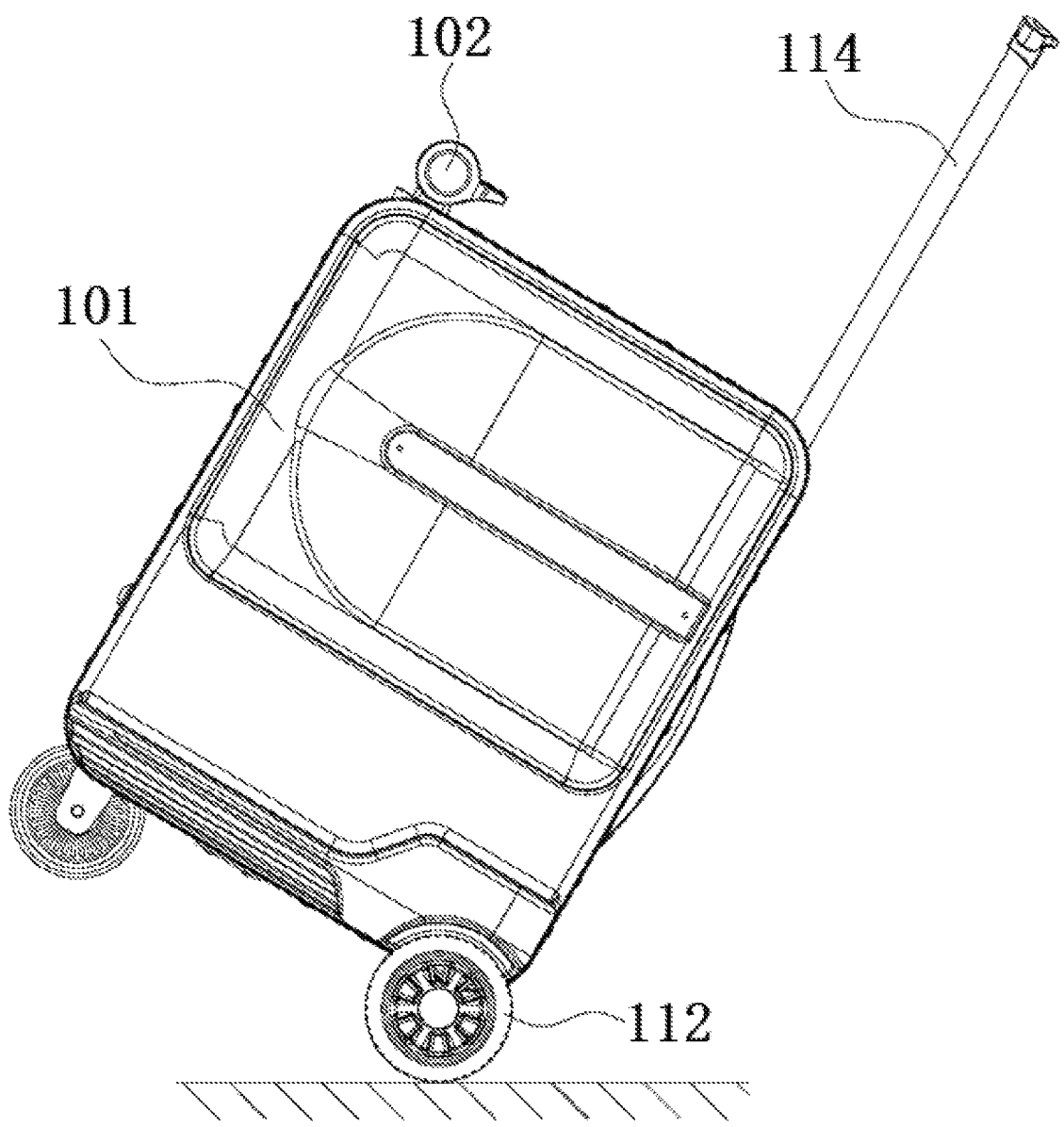
FIG. 15 is a schematic view of the electric luggage box used as an ordinary luggage box by using a pull rod.

Referring to FIG. 13 and FIG. 14, this embodiment provides an electric luggage box, which comprises a box body 101, a front wheel 111 and a rear wheel 112 mounted on the box body 101, a steering device 102 connected to the front wheel 111 for steering the front wheel 111, a battery (not shown in the figure) and a pull rod 114 mounted in a rear part of the box body for pushing or pulling the electric luggage box to move. The front wheel 111 adopts a wheel with a hub motor. The battery is electrically connected to the wheel with the hub motor for supplying working power thereto. A control module 113 is communicationally connected to the wheel with the hub motor for controlling the wheel with the hub motor to rotate. In an electrical driven mode of the electric luggage box, a user rides on the box body 101 and manually operates a running controller 122 mounted on the steering device 102, the running controller 122 converts the user's operation instruction into electric signal and sends the electric signal to the control module 113, the control module 113 controls the front wheel 111 to rotate according to the operation instruction, and the rear wheel 112 follows the front wheel 111 to rotate. The user turns the steering device 102 to steer the front wheel 111 and thus steer the electric luggage box. The front wheel 111 not only can steer the electric luggage box, but also can provide power for movement of the electric luggage box. A user can ride the electric luggage box to save physical power, and the user experience is also improved. Of course, a user may also put the electric luggage box to be tilted relative to the ground (as shown in FIG. 15) and supported on the ground only by the rear wheel 112, at this time, the user can push or pull the electric luggage box to move by using the pull rod 114 mounted on the rear part of the box body, so that it is used like an ordinary luggage box.

It should be noted that, in other embodiments, the rear wheel 112 of the electric luggage box may be a wheel with a hub motor, and accordingly the front wheel 111 follows the rear wheel 112 to rotate.

Figure 16:
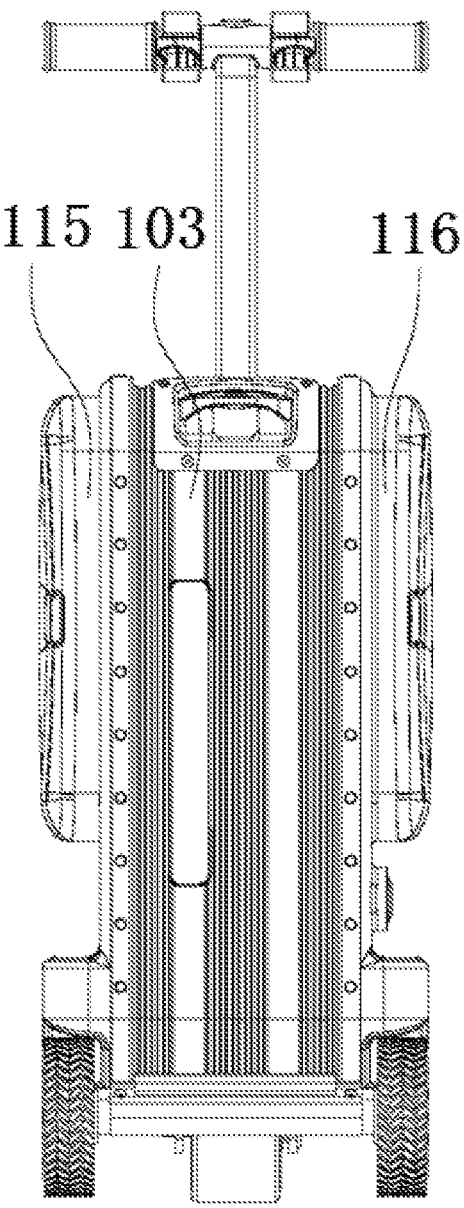
FIG. 16 is a rear view of the electric luggage box.
Figure 17:
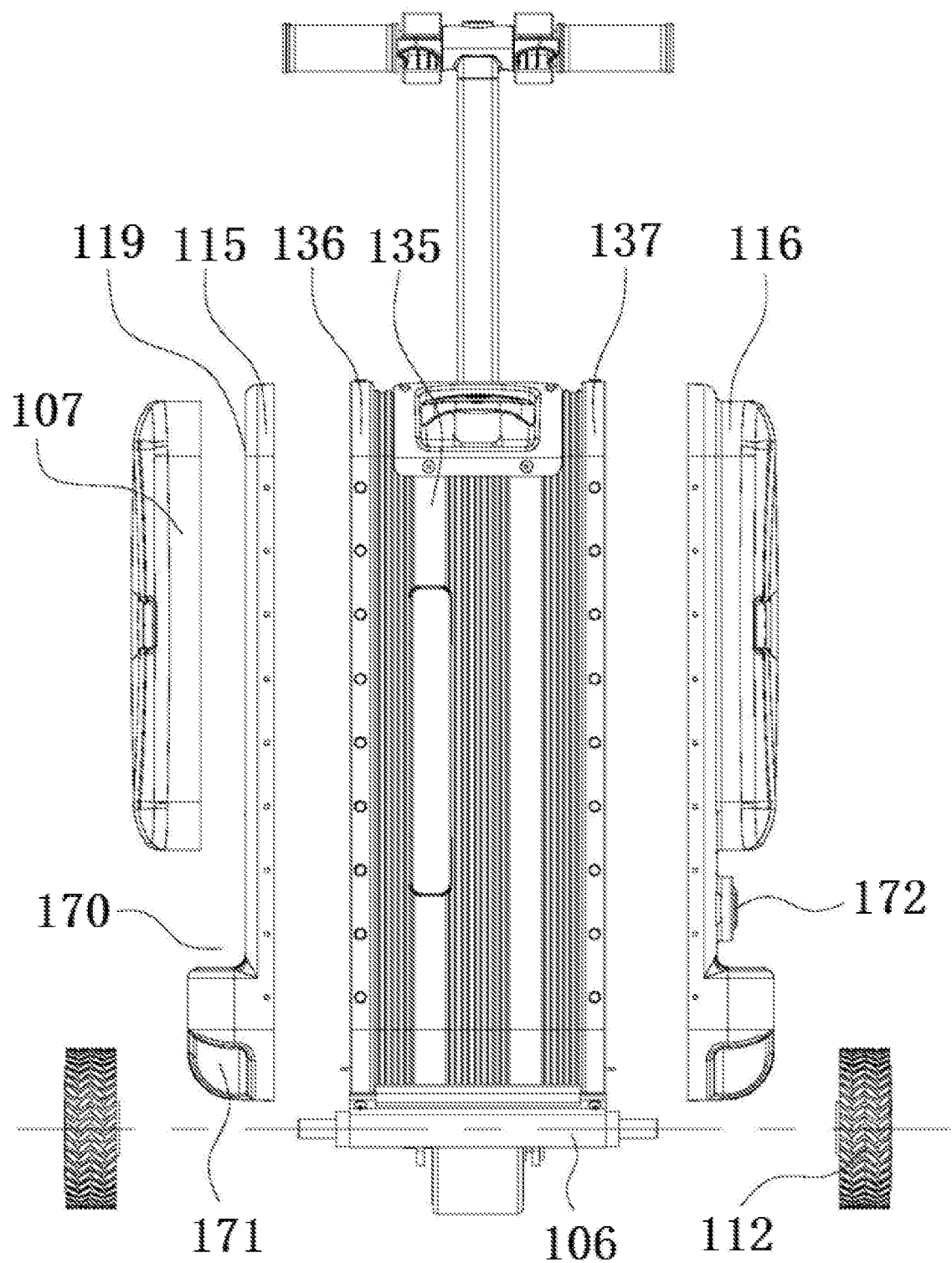
FIG. 17 is an explode view of the box body in the present disclosure.
Figure 18:
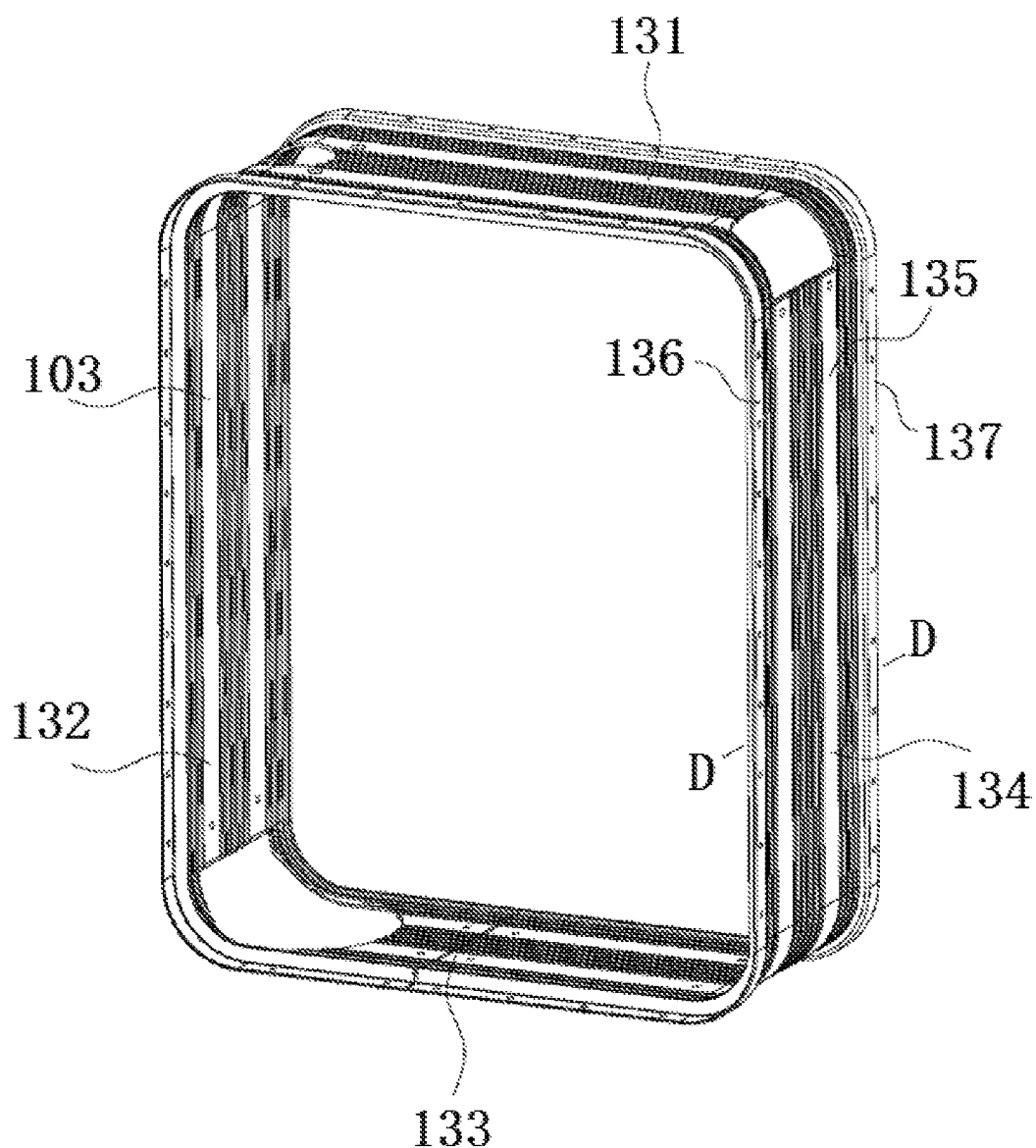
FIG. 18 is a perspective view of the ring frame in the present disclosure.

Referring to FIG. 16 to FIG. 18, in this embodiment, the box body 101 comprises a ring frame 103, with a first cover 115 and a second cover 116 respectively mounted on both lateral sides of the ring frame 103. The ring frame 103 is a ring bracket formed by strip metal plates joined head-to-tail and bent into a ring. The head-to-tail joint is fastened by a reinforcement plate 117. The ring frame 103 has a quadrangle shape. Of course, in other embodiments, the ring frame 103 may also has a circular shape, an oval shape, or a polygonal shape having a different number of edges, such as a pentagon or a hexagon. In this embodiment, the ring frame 103 has a first connection plate 131, a second connection plate 132, a third connection plate 133 and a fourth connection plate 134 sequentially connected head-to-tail. Wherein, the first connection plate 131 and the third connection plate 133 are arranged in an upper position and a lower position opposite to each other, the second connection plate 132 and the fourth connection plate 134 are arranged in a front position and a rear position opposite to each other. The connection part of any two adjacent connection plates has a curved shape. The first connection plate 131 forms a top wall of the box body 101, the second connection plate 132 forms a front wall of the box body 101, the third connection plate 133 forms a bottom wall of the box body 101, and the fourth connection plate 134 forms a back wall of the box body 101. An accommodation space of the box body 101 is formed between the plates of the first connection plate 131, the second connection plate 132, the third connection plate 133 and the fourth connection plate 134. Using the ring frame 103 as a main support member of the box body 101 not only makes the box body 101 easy to assemble, but also saves the manufacture cost of the box body 101. The ring frame 103 having a metal structure not only can bear the user's weight, but also can increase the structural stability of the box body 101 and prevent the box body 101 from deforming. Of course, in other embodiments, the ring frame 103 may also serve as a lining of the box body of the electric luggage box. In this embodiment, the strip metal plates are stretched aluminum profiled sheets made of aluminum alloy. Of course, in other embodiments, the strip metal plates may also be flat stretched sheets made of stainless steel or other materials according to design needs, for example, stainless steel plates.

Figure 19:
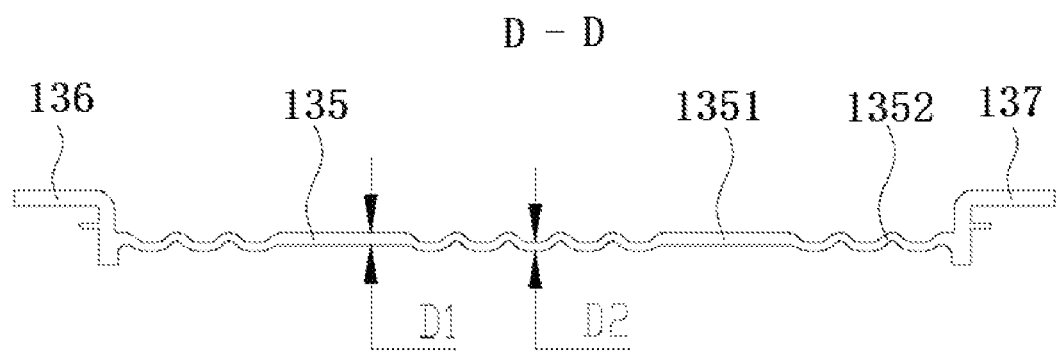
FIG. 19 is a sectional view along the D-D line in FIG. 18.

Referring to FIG. 17 to FIG. 19, the ring frame 103 comprises a main body 135 in the middle of the ring frame 103, and a first edge part 136 and a second edge part 137 on both sides of the main body 135. The first cover 115 is mounted on the first edge part 136, and the second cover 116 is mounted on the second edge part 137. The main body 135 of the ring frame 103 comprises a straight segment 1351 and a waved segment 1352 arranged next to one another. The straight segment 1351 and the waved segment 1352 are arranged in an alternate and continuous manner. The numbers of straight segment(s) 1351 and waved segment(s) 1352 are set according to design needs, for example, there are two straight segments 1351 and three waved segments 1352 arranged alternately. The waved segments 1352 serve as reinforcement ribs of the ring frame 103. The number of the reinforcement ribs is set according to the width of the ring frame 103, for example, two to four reinforcement ribs are arranged in parallel. There may also be only one reinforcement rib. Every reinforcement rib on the ring frame 103 has a ring shape. The parallel reinforcement ribs increase the support strength of the ring frame 103. The straight segment 1351 has a wall thickness of D1, the waved segment 1352 has a wall thickness of D2, wherein D1 is larger than D2. Setting the wall thickness of the waved segment 1352 to be less than the wall thickness of the straight segment 1351 facilitates the stretching of the aluminum profiled sheet, and the strength of the ring frame 103 is increased by forming the reinforcement ribs. The wall thickness of the ring frame 103 is set by calculation according to the weight that needs to be borne by the electric luggage box and the material to be used, for example, the straight segment 1351 has a wall thickness D1 of 1.5-2.5 mm, the waved segment 1352 has a wall thickness D2 of 0.6-2.0 mm, and accordingly, on the basis of ensuring the support strength of the ring frame 103, the weight of the box body 101 is reduced, so it is easy for a user to carry the electric luggage box, and the production cost of the electric luggage box is also reduced. In this embodiment, the weight that needs to be borne by the electric luggage box is 100 kilograms, the ring frame 103 is made of aluminum alloy, the straight segment 1351 has a wall thickness D1 of 1.8-2.2 mm, and the waved segment 1352 has a wall thickness D2 of 0.8-1.8 mm. Preferably, the straight segment 1351 has a wall thickness D1 of 2 mm, and the waved segment 1352 has a wall thickness D2 of 1.3 mm.

Figure 20:
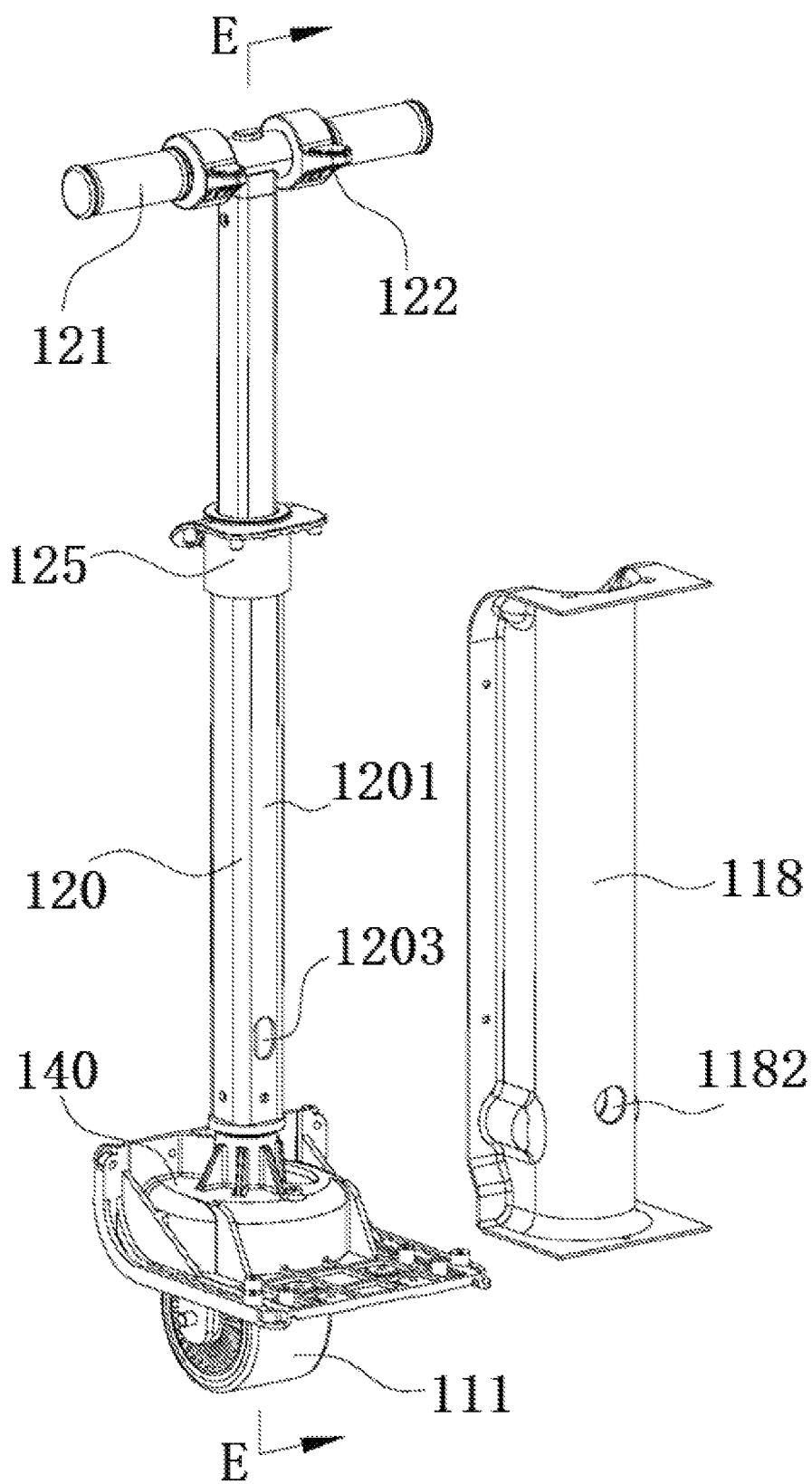
FIG. 20 is a schematic view of the steering device connected to the front wheel and the wrapping shield in the present disclosure.

Referring to FIG. 14 and FIG. 20, in this embodiment, the steering device 102 is mounted in a front part of the ring frame 103. The steering device 102 comprises a steering rod 120, and a steering handle 121 connected to the steering rod 120 and situated outside the accommodation space. The first connection plate 131 of the ring frame 103 (the top wall of the box body) has a through-hole for cooperating with and mounting the steering rod 120. The steering rod 120 passes through the first connection plate 131, and the steering handle 121 is situated above the box body 101, so it is convenient for a user to operating the steering handle 121 when riding on the box body 101. The third connection plate 133 of the ring frame 103 (the bottom wall of the box body) is provided with a fastening seat 140 for mounting the front wheel 111. The steering rod 120 is connected to the front wheel 111, so the user can turn the steering handle 121 to steer the front wheel 111. In the electric luggage box of this embodiment, the fastening seat 140 for mounting the front wheel 111 is arranged in the interior of the box body, with the steering device 102 passing through the top wall of the box body to be connected to the front wheel 111 mounted on the fastening seat 140, so that the steering device 102 is mounted in the interior of the box body, thereby reducing the volume of the electric luggage box; furthermore, the front wheel 111 connected to the steering device 102 is mounted on the bottom wall of the box body, which can also reduce the front-rear dimension of the electric luggage box in comparison with the design of arranging the front wheel on a front side of the box body as in prior art, so the volume of the electric luggage box can be correspondingly reduced; this also makes it easy to put away the electric luggage box.

Figure 22:
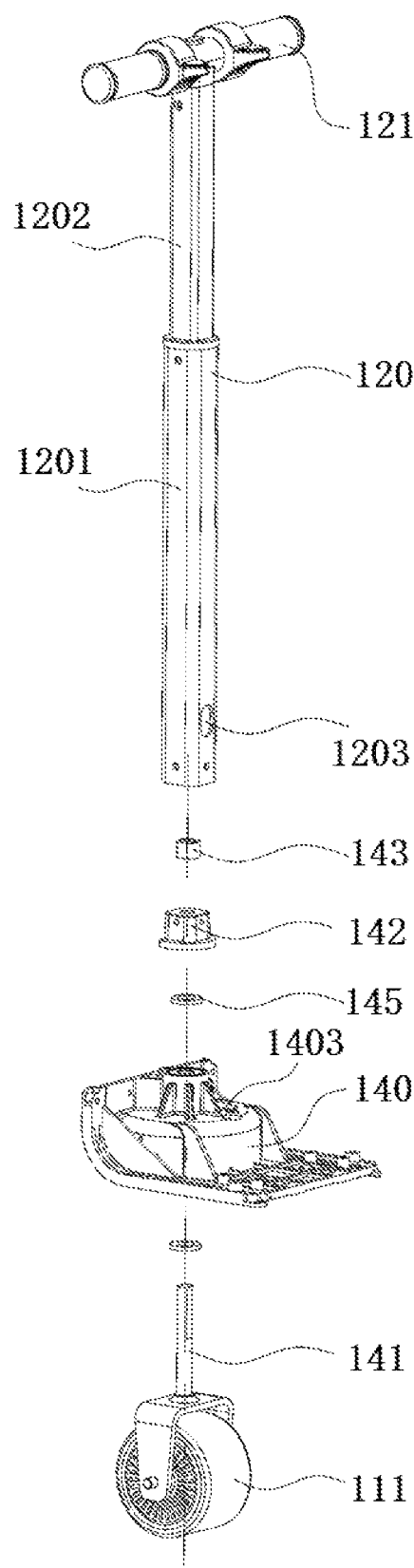
FIG. 22 is an explode view of the front wheel connected to the steering device.

Referring to FIG. 14, FIG. 20 and FIG. 22, the front wheel 111 is mounted on the bottom of the ring frame 103 and at a front end portion of the ring frame 103. The front wheel 111 is mounted on the ring frame 103 and connected to the steering rod 120 of the steering device 102 by means of a steering connector member 141. There is one front wheel 111. The steering connector member 141 adopts a wheel fork, and the front wheel 111 is mounted on the wheel fork through an axle. Of course, in other embodiments, there may be two front wheels 111, and the steering connector member 141 may correspondingly adopt an axle support bracket, with the two front wheels 111 mounted on the axle support bracket.

Figure 23:
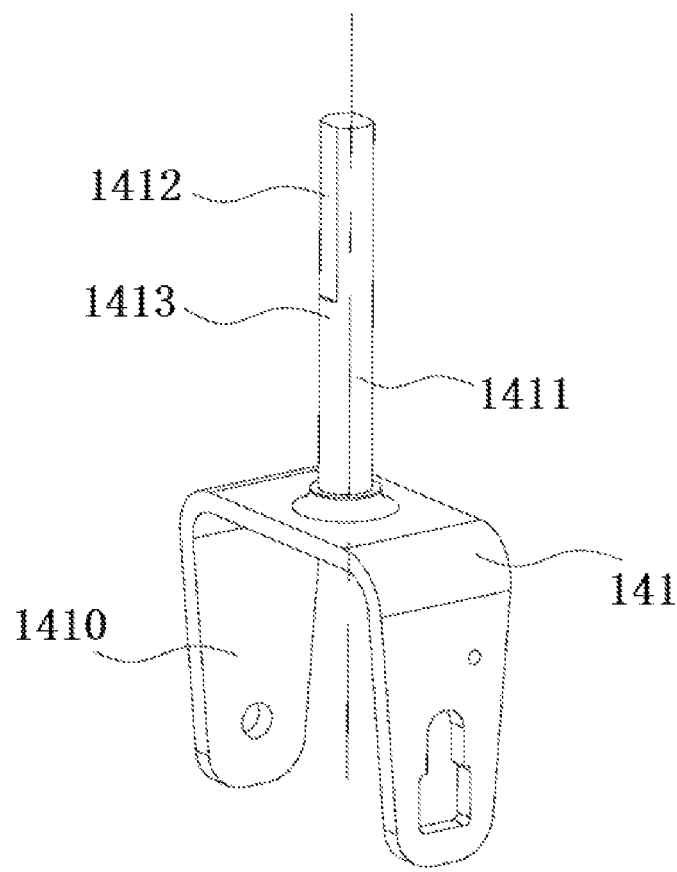
FIG. 23 is a perspective view of a steering connector member in the present disclosure.

Referring to FIG. 22 and FIG. 23, in this embodiment, the steering connector member 141 comprises a U-shaped fork 1410 for mounting the axle, and an upright rod 1411 fixedly connected to the U-shaped fork 1410. The front wheel 111 is mounted on the U-shaped fork 1410 through the axle. The upright rod 1411 is fixedly connected to the steering rod 120 of the steering device 102, so that rotation of the steering rod 120 effects rotation of the upright rod 1411. The upright rod 1411 and the steering rod 120 are situated on the same axis of rotation and are rotatable around the same axis of rotation, and by rotating the steering rod 120, the upright rod 1411 turns the front wheel 111 in synchronization therewith.

Figure 24:
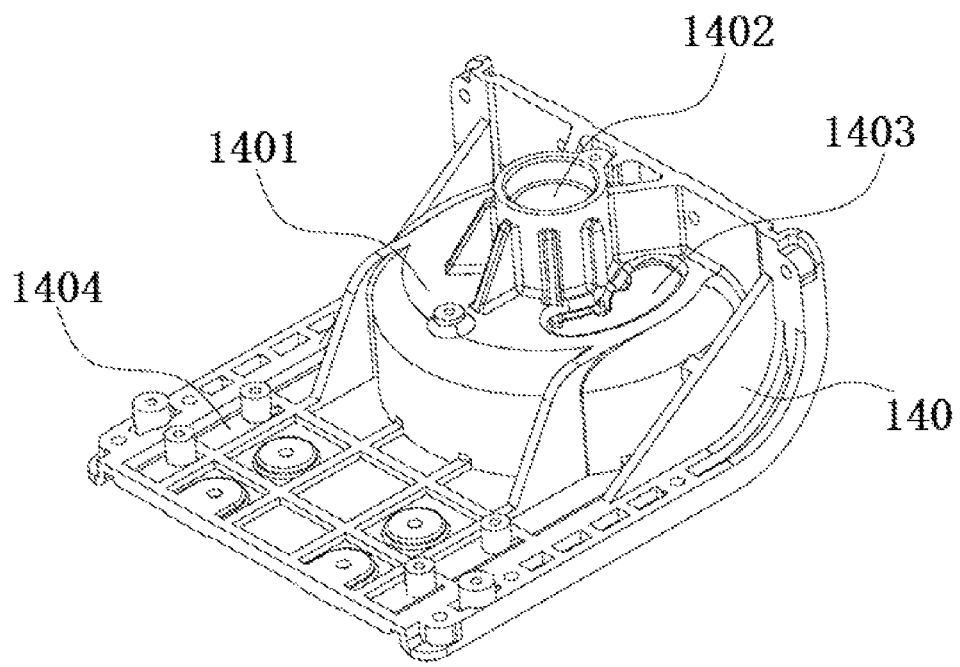
FIG. 24 is a perspective view of a fastening seat in the present disclosure.

Referring to FIG. 20, FIG. 22 and FIG. 24, the fastening seat 140 comprises a bearing cover 1401 and an upright tube 1402 fixedly connected to the bearing cover 1401. The bearing cover 1401 is situated inside the box body 101, and encloses an upper part of the U-shaped fork 1410. The bearing cover 1401 has a rotation space to allow the U-shaped fork 1410 to rotate along with the upright rod 1411, which is beneficial for the wheel fork to follow the rotation of the steering rod 120. The bearing cover 1401 can also prevent dust from infiltrating the box body 101. The upright tube 1402 is sleeved outside the upright rod 1411, and the upright rod 1411 is rotatably connected to the upright tube 1402 through a bearing. It should be noted that, when the front wheel 111 adopts a wheel with a hub motor, in order to facilitate connecting the control module 113 and the battery to the wheel with the hub motor, the wheel with the hub motor is respectively connected to the control module 113 and the battery via conductive wires. The conductive wire comprises a signal line and a power line. The bearing cover 1401 has a first wire hole 1403 for the conductive wires to pass through, which facilitates leading the conductive wires from the interior of the ring frame 103 to the exterior of the ring frame 103. The first wire hole 1403 is an elongated hole having a curved shape, which can provide a space for movement of the conductive wires and this prevent the conductive wires from being pulled to break. In this embodiment, the front wheel 111 is mounted onto the fastening seat 140 situated in the interior of the box body 101 by means of the wheel fork, which not only facilitates mounting the front wheel 111, but also saves the volume of the electric luggage box; the front wheel 111 is thus connected to the steering rod 120 of the steering device 102, so that a user can turn the steering handle 121 to steer the electric luggage box.

The edge of the bearing cover 1401 extends along an inner edge of the ring frame 103, and its extension part 1404 closely fits an inner wall of the box body 101 and is mounted on the ring frame 103 by fasteners, thereby increasing the mounting firmness of the fastening seat 140. The bearing cover 1401, the extension part 1404 thereof and the upright tube 1402 are manufactured in one piece by mold Injection. Multiple reinforcement ribs are provided on a periphery of the upright tube 1402 to increase the stability of the upright tube 1402. The control module 113 is mounted on the extension part 1404 of the bearing cover 1401 (as shown in FIG. 14), which can reduce the open-hole weakening to the ring frame 103 and increase the support strength of the ring frame 103 to the greatest extent.

Figure 25:
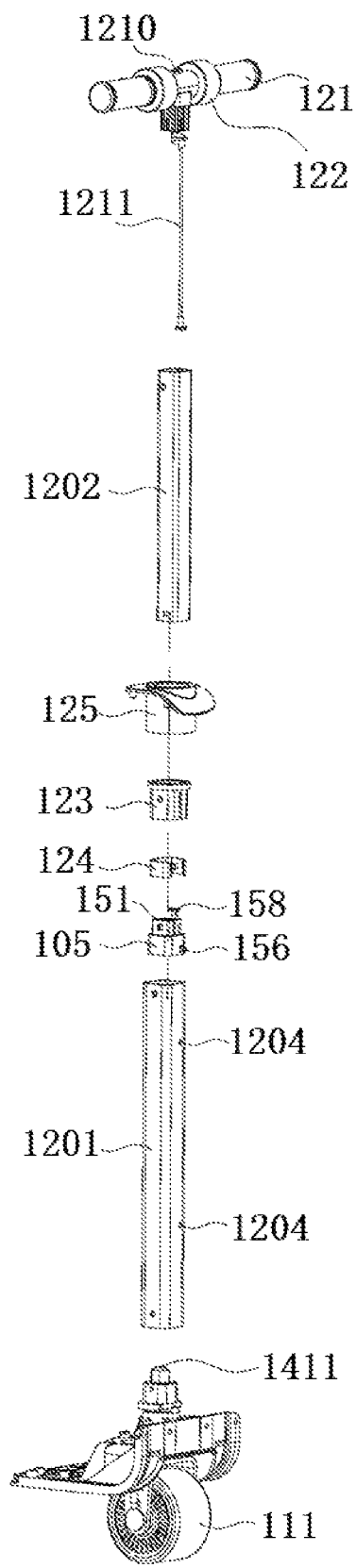
FIG. 25 is an explode view of the steering device connected to the steering connector member.

Referring to FIG. 20, FIG. 22 and FIG. 25, in this embodiment, the steering rod 120 comprises a second tube 1201 fixedly connected to the upright rod 1411, a first tube 1202 telescopically connected to the second tube 1201 and also connected to the steering handle 121, a positioning seat 105 for limiting the telescopic position of the first tube 1202 relative to the second tube 1201, and conductive wires (not shown in the figure) passing through the interior of the second tube 1201 and the first tube 1202 and also connected to the steering handle 121. The telescopic steering rod 120 is beneficial for adjusting the operating height of the steering handle 121, thereby facilitating users with different body builds to ride the electric luggage box. When the steering handle 121 is adjusted to a minimal height, it is beneficial for the user to put away the electric luggage box, as it saves the storage space. The running controller 122 for operating the electric luggage box to run is mounted on the steering handle 121, and the conductive wire thereof passes through the steering rod 120 to be connected to the running controller 122, which improves the aesthetic property of the electric luggage box. One end of the conductive wire is connected to the running controller 122, and the other end thereof is connected to the control module 113. Wherein, a tube wall at the bottom part of the second tube 1201 has a second wire hole 1203 for leading the conductive wire from inside the tubular space of the steering rod 120 to the exterior of the steering rod 120. Said other end of the conductive wire passes through the second wire hole 1203 to be connected to the control module 113, This conductive wire adopts a signal line. Of course, in other embodiments, when the steering handle 121 is mounted with an electronic device, the conductive wire may also be a power line, the corresponding conductive wire can be selected according to the design of the steering device 102.

Figure 21:
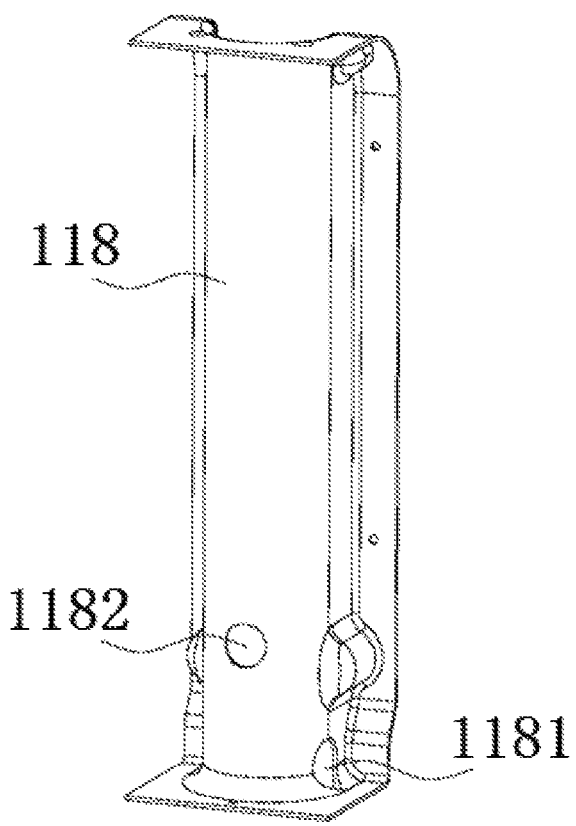
FIG. 21 is a perspective view of the wrapping shield in the present disclosure.

Referring again to FIG. 14 and FIG. 20, a wrapping shield 118 for wrapping the second tube 1201 is mounted on an inner wall of the ring frame 103, so that the second tube 1201 is separated from the luggage placing area. The wrapping shield 118 is arranged along the longitudinal direction of the second tube 1201 and closely fits the second connection plate 132 of the ring frame 103 (the front wall of the box body); an upper end of the wrapping shield 118 extends to the first connection plate 131 of the ring frame 103 (the top wall of the box body) and is fixed on the first connection plate 131; a lower end of the wrapping shield 118 extends to the fastening seat 140 mounted on the ring frame 103 and is fixed on the bearing cover 1401 of the fastening seat 140. The wrapping shield 118 has a third wire hole 1182 corresponding to the second wire hole 1203. The wrapping shield 118 can also further increase the support strength of the ring frame 103. The conductive wire for connecting to the running controller 122 has its other end passing through the second wire hole 1203 and then through the third wire hole 1182 to be connected to the control module 113. It should be noted that, the wrapping shield 118 also has a fourth wire hole 1181 (as shown in FIG. 21) corresponding to the first wire hole 1403, the conductive wires for connecting to the wheel with the hub motor pass through the first wire hole 1403 and then through the fourth wire hole 1181 to be respectively connected to the control module 113 and the battery. Of course, the wrapping shield 118 may not have the fourth wire hole 1181, and the conductive wires for connecting to the wheel with the hub motor may pass through the first wire hole 1403 and then through the third wire hole 1182, so as to be also able to be connected to the control module 113 and the battery.

Figure 26:
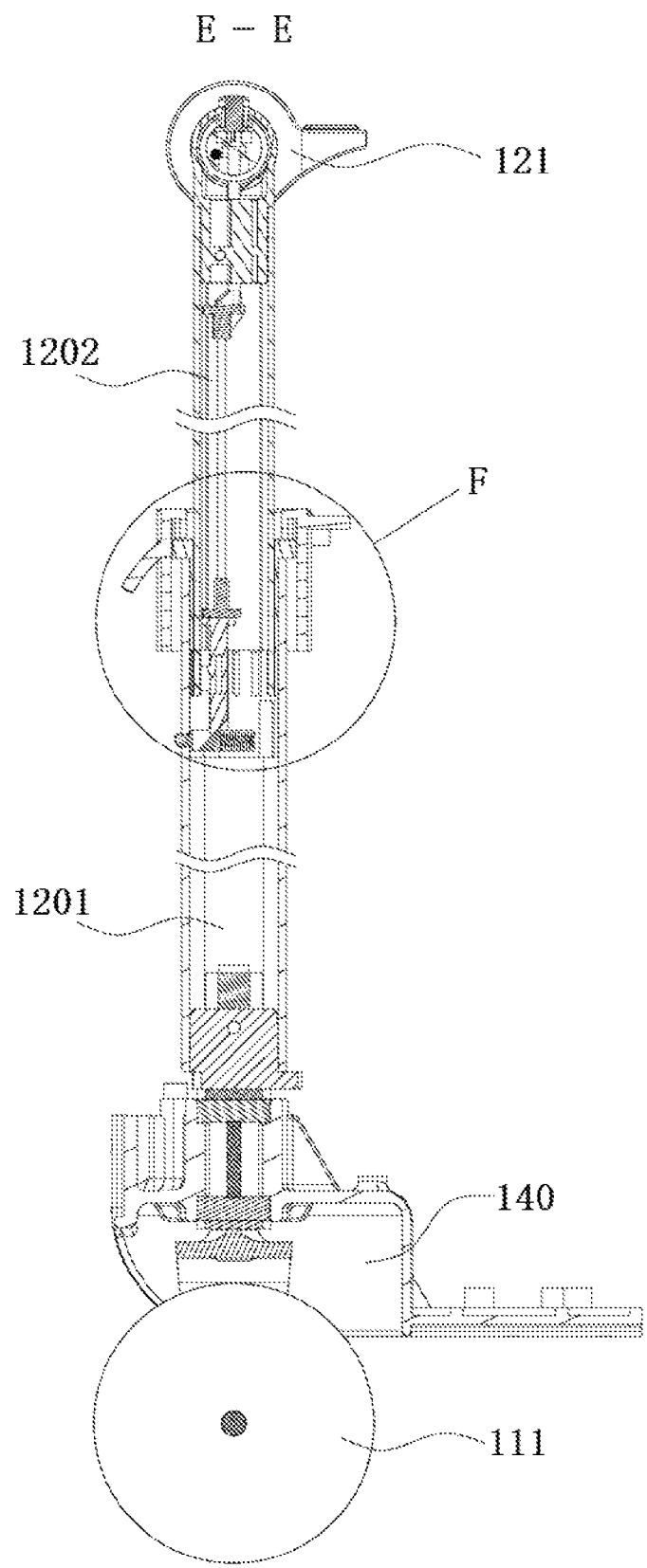
FIG. 26 is a sectional view along the E-E line in FIG. 20.
Figure 27:
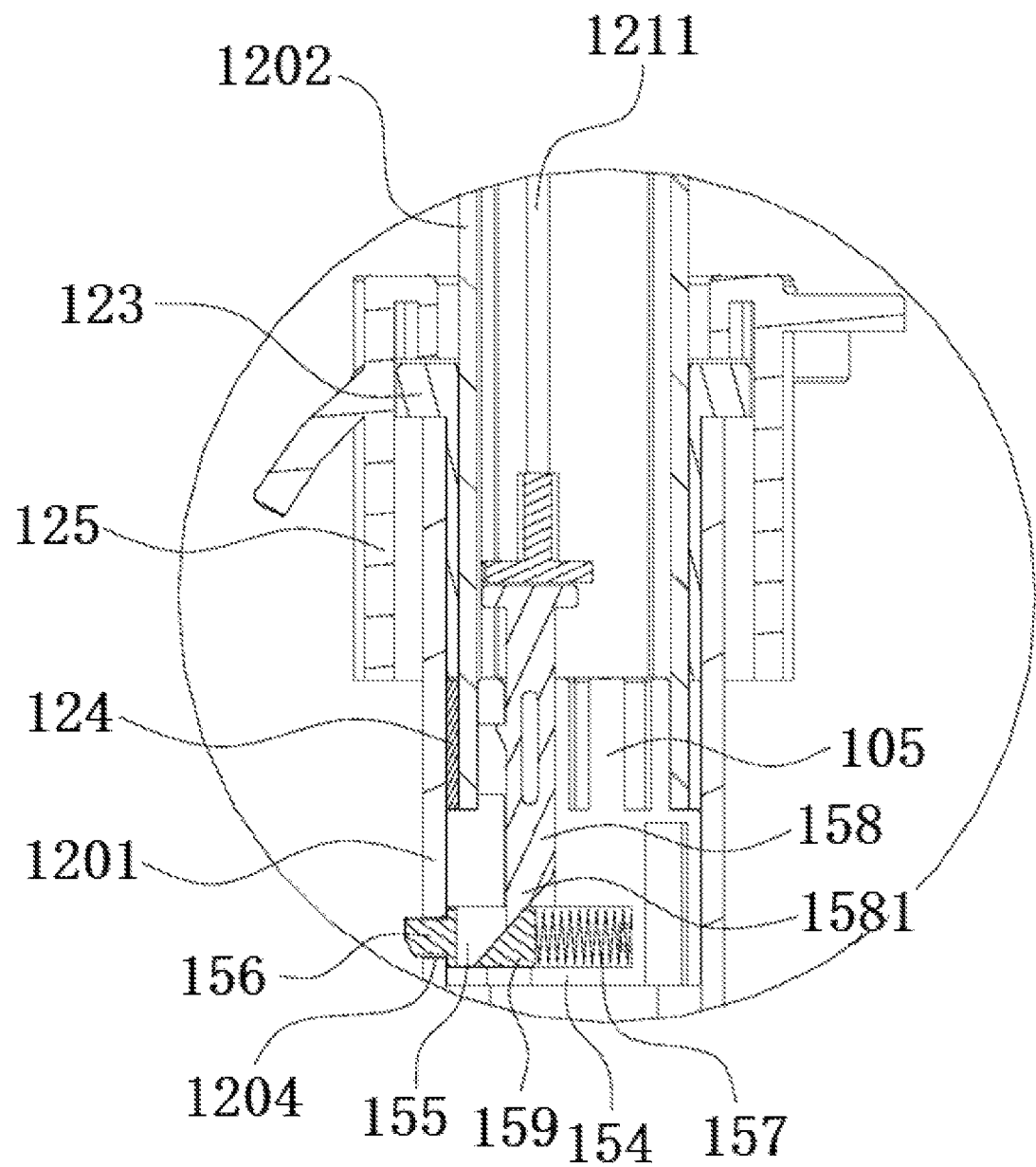
FIG. 27 is a partial enlarged view of the part F in FIG. 26.
Figure 28:
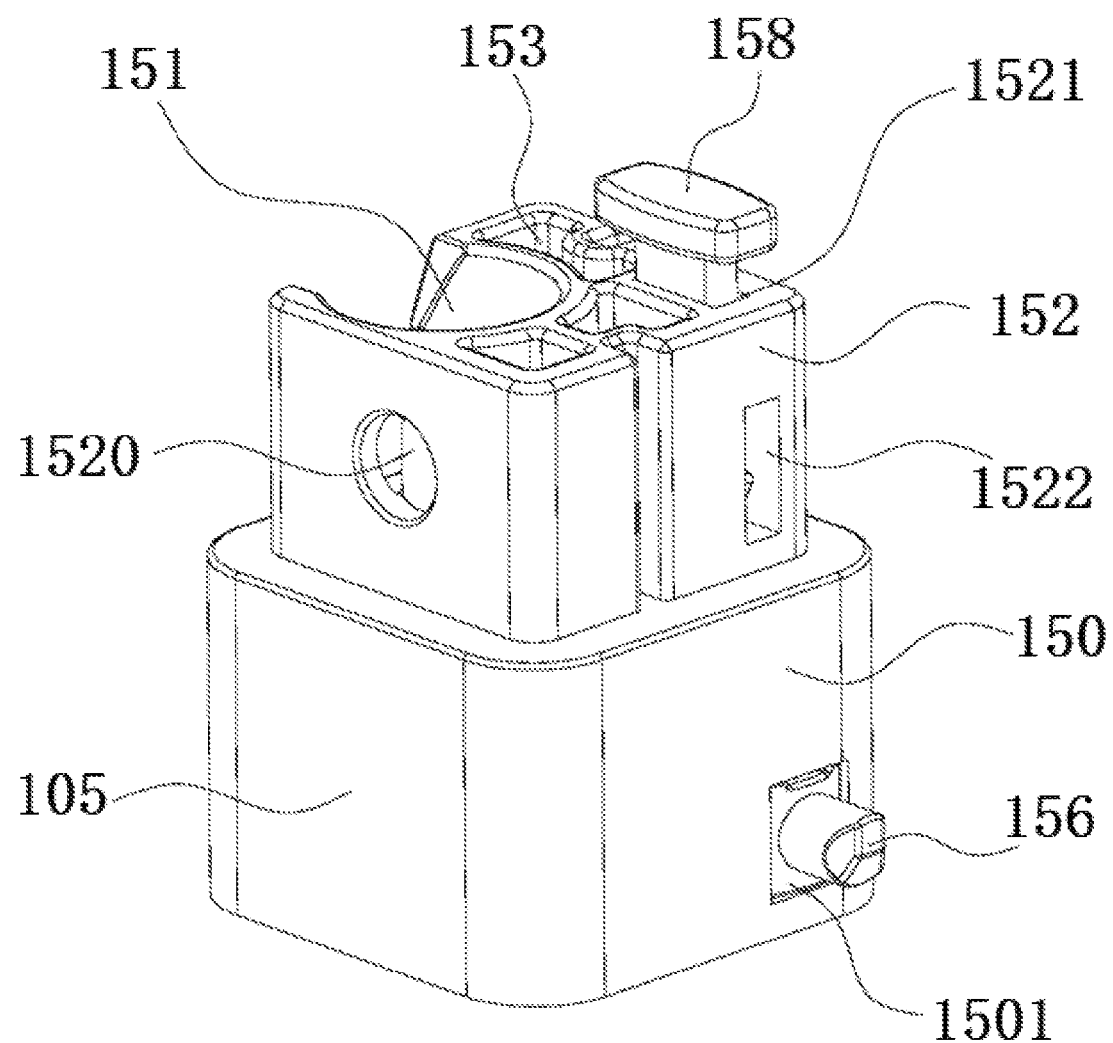
FIG. 28 is a perspective view of a positioning seat in the present disclosure.

Referring to FIG. 25, FIG. 26 and FIG. 27, the second tube 1201 and the first tube 1202 both have hollow tubular structures. The hollow tubular space of the second tube 1201 and the first tube 1202 has a cross-section of a circular shape, an oval shape or a polygonal shape. The polygonal shape may be a triangle, a quadrangle or a pentagon, wherein the specific number of edges of the polygonal shape may be set according to actual needs. In this embodiment, the hollow cross-section of the tubular structure has a quadrangle shape, so as to guide the telescopic movement direction of the first tube 1202 relative to the second tube 1201 and also reduce the swaying of the first tube 1202 relative to the second tube 1201 in a stretched state of the steering rod 120. A clearance fit is provided between the second tube 1201 and the first tube 1202. A tube bush 123 is provided in the gap between the second tube 1201 and the first tube 1202. The tube bush 123 is fixed at a top end of the second tube 1201 and situated between the second tube 1201 and the first tube 1202. The second tube 1201 is sleeved on a periphery of the first tube 1202. The tube bush 123 can reduce the contact area between the second tube 1201 and the first tube 1202, so that the friction is reduced and the relative sliding performance is improved; it also prevents an inner wall of the second tube 1201 from scoring an outer wall of the first tube 1202. The positioning seat 105 is mounted on a nested end of the first tube 1202. The positioning seat 105 has a passing-through space 151 (as shown in FIG. 28) for the conductive wire connecting to the steering handle 121 to pass through, the passing-through space 151 extends in the longitudinal direction of the steering rod 120. The conductive wire passes through the passing-through space 151 and extends in both the second tube 1201 and the first tube 1202. Wherein, at least part of the conductive wire has an elastic spiral shape, so as to cooperate with the steering rod 120 in the stretched state and the retracted state.

Figure 29:
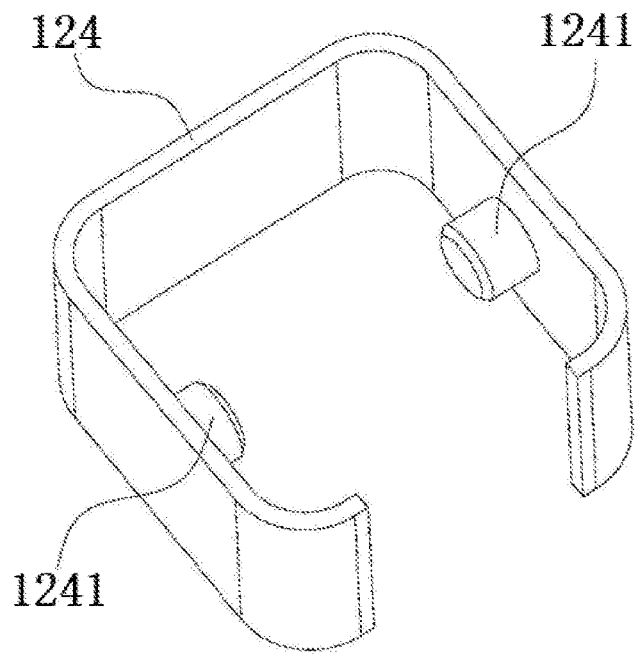
FIG. 29 is a perspective view of a U-shaped clamping band in the present disclosure.

Referring to FIG. 26 to FIG. 28, the positioning seat 105 is a columnar seat comprising an upper seat body 152 and a lower seat body 150. The passing-through space 151 for the conductive wire to pass through extends in the upper seat body 152 and the lower seat body 150. The passing-through space 151 has a circular shape and is situated on one side of the positioning seat 105. The upper seat body 152 of the positioning seat 105 is inserted in the tubular space of the first tube 1202. The upper seat body 152 and a tube wall of the first tube 1202 have pin holes 1520 for cooperating with pins to form a fixed connection. A U-shaped clamping band 124 is provided on a periphery of the first tube 1202 and sleeved on the first tube 1202. The U-shaped clamping band 124 is situated between the first tube 1202 and the second tube 1201. Fixing pins 1241 (as shown in FIG. 29) are provided on a wall of the U-shaped clamping band 124 for inserting into the pin holes 1520. The fixing pins 1241 make the positioning seat 105 be fixedly connected to the first tube 1202, thereby increasing the mounting firmness of the positioning seat 105. The lower seat body 150 is exposed out of the first tube 1202 and situated on a lower side of the first tube 1202. The lower seat body 150 is mounted in the tubular space of the second tube 1201 in a cooperative way. The positioning seat 105 is fixedly connected to the first tube 1202 through the upper seat body 152, which makes the positioning seat 105 easy to assemble, and the mounting difficulty level is reduced. Of course, in other embodiments, the positioning seat 105 may be entirely mounted within the tubular space of the first tube 1202, and may be fixedly connected to the first tube 1202 by a fastener.

Referring to FIG. 27 and FIG. 28, the positioning seat 105 comprises the passing-through space 151 on one side of the positioning seat 105 and a pin mounting part 153 on the other side of the positioning seat 105. The pin mounting part 153 comprises a seat base 154 having an inner cavity, a sliding member 155 mounted in the inner cavity of the seat base 154, a position-limiting pin 156 protruding from one end of the sliding member 155 and slidable together with the sliding member 155, a spring 157 connected to the other end of the sliding member 155 and pressing on the sliding member 155, and a sliding plug 158 extending into the seat base 154 to press on the sliding member 155 and control the sliding member 155 to slide. The upper seat body 152 of the positioning seat 105 is provided with a first opening 1521 for the sliding plug 158 to extend into the seat base 154. The sliding plug 158 passes through the first opening 1521 and presses on the sliding member 155. The position-limiting pin 156 mounted on the seat base 154 is situated in the lower seat body 150 of the positioning seat 105, and the seat base 154 is provided with a second opening 1501 for the position-limiting pin 156 to extend out of the seat base 154.

Referring to FIG. 25, FIG. 27 and FIG. 28, the second tube 1201 has position-limiting holes 1204 to cooperate with the position-limiting pin 156. When the position-limiting pin 156 is inserted into a position-limiting hole 1204, the telescopic position of the first tube 1202 relative to the second tube 1201 can be locked. On the contrary, when the position-limiting pin 156 is pulled out of the position-limiting hole 1204, the telescopic position of the first tube 1202 relative to the second tube 1201 can be adjusted. There are at least two position-limiting holes 1204, for defining at least two telescopic positions of the first tube 1202 relative to the second tube 1201. The sliding member 155 has a sliding block 159 cooperating with the pressing-on of the sliding plug 158. The sliding block 159 has a first sliding angular surface. The pressing end of the sliding plug 158 has a pressing block 1581 cooperating with the sliding block 159 in a sliding manner. The pressing block 1581 has a second sliding angular surface to cooperate with the first sliding angular surface in a sliding manner. A pushrod 1211 is provided between a press button 1210 and the sliding plug 158, the pushrod 31 transmits a pressing force applied from the press button 1210 to the sliding plug 158. When a user presses the press button 1210 downward, a force is applied to the sliding plug 158 through the pushrod 1211, the pressing block 1581 moves downward together with the sliding plug 158, and as the second sliding angular surface abuts the first sliding angular surface, the sliding member 155 can thereby be retracted towards the inner side of the seat base 154, and at the same time the position-limiting pin 156 follows the sliding member 155 to move towards the inner side of the seat base 154, so that the position-limiting pin 156 is pulled out of the position-limiting hole 1204 and thus the telescopic position of the first tube 1202 relative to the second tube 1201 becomes adjustable. When the user stops applying the force on the pushrod 1211 (i.e., the pressing force of the pushrod 31 is relieved), the spring 157 mounted in the seat base 154 presses the sliding member 155 to slide towards the outer side of the seat base 154 by its resilient stretching force, the first sliding angular surface of the sliding block 159 oppositely presses on the pressing block 1581 to cause the sliding plug 158 to move upward, the position-limiting pin 156, together with the sliding member 155, moves towards the outer side of the seat base 154. As the user pulls the first tube 1202 up and down relative to the second tube 1201, when the position-limiting pin 156 moves to a position of another position-limiting hole 1204 on the second tube 1201, the spring 157 is further released, and the resilient stretching force of the spring 157 causes the position-limiting pin 156 to insert into this another position-limiting hole 1204, such that the first tube 1202 is locked in another telescopic position relative to the second tube 1201.

Figure 30:
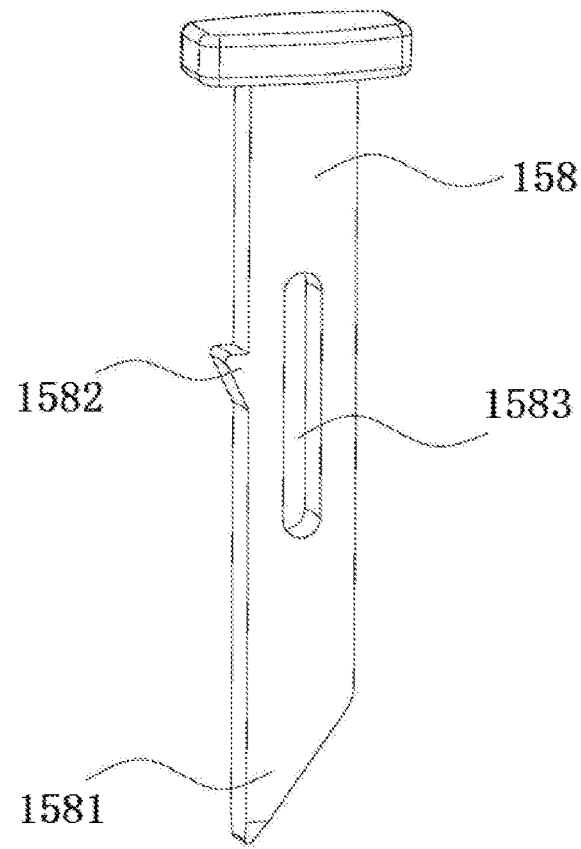
FIG. 30 is a perspective view of a sliding plug in the present disclosure.

Referring to FIG. 27, FIG. 28 and FIG. 30, in order to prevent the sliding plug 158 from being separated from the first opening 1521 when the sliding plug 158 moves up and down relative to the first opening 1521, a side surface of the sliding plug 158 is provided with a wedge 1582 for unidirectional downward guide-in. The hollow part of the positioning seat 105 is provided with a sliding space 1522 to accommodate the wedge 1582 to move up and down, wherein the up-and-down movement distance of the wedge 1582 is limited by the height of the sliding space 1522, so that the sliding plug 158 can be prevented from being separated from the first opening 1521. The sliding plug 158 is made of plastics and has an elongated hole 1583. The position of the wedge 1582 corresponds to the location of the elongated hole 1583. When mounting the sliding plug 158, the operator compresses the waist part of the sliding plug 158 at the elongated hole 1583 to the middle, causing the part of the sliding plug 158 with the elongated hole 1583 to deform, so the wedge 1582 on the side surface of the sliding plug 158 can be easily assembled into the sliding space 1522, thereby facilitating the mounting of the sliding plug 158. The first opening 1521 has a guide chamfer to facilitate the mounting of the wedge 1582, so that the mounting efficiency of the sliding plug 158 is further increased, and the sliding plug 158 is easy to mount.

Figure 31:
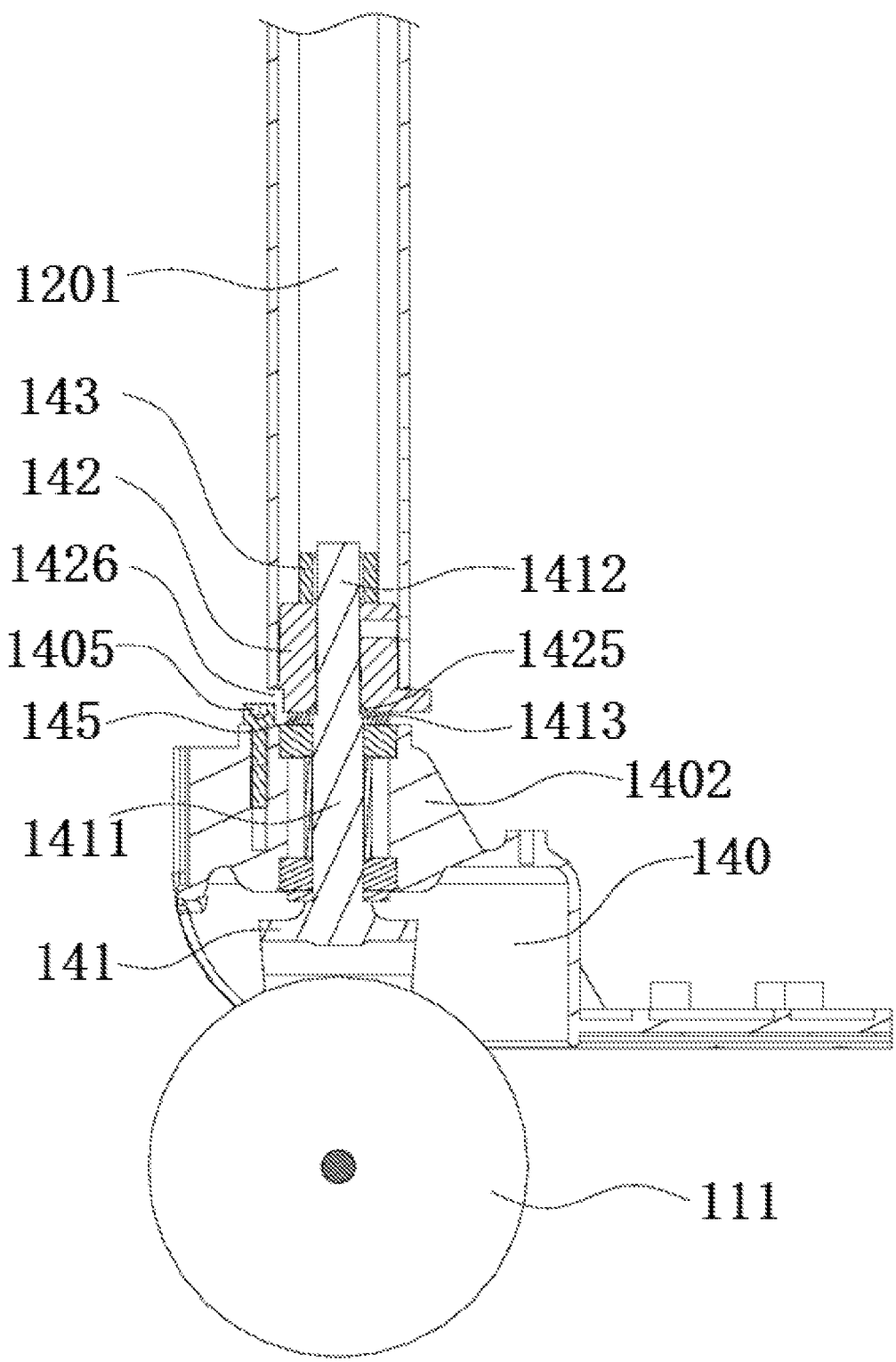
FIG. 31 is a connection view of the steering connector member connected to the fastening seat and the second tube.
Figure 32:
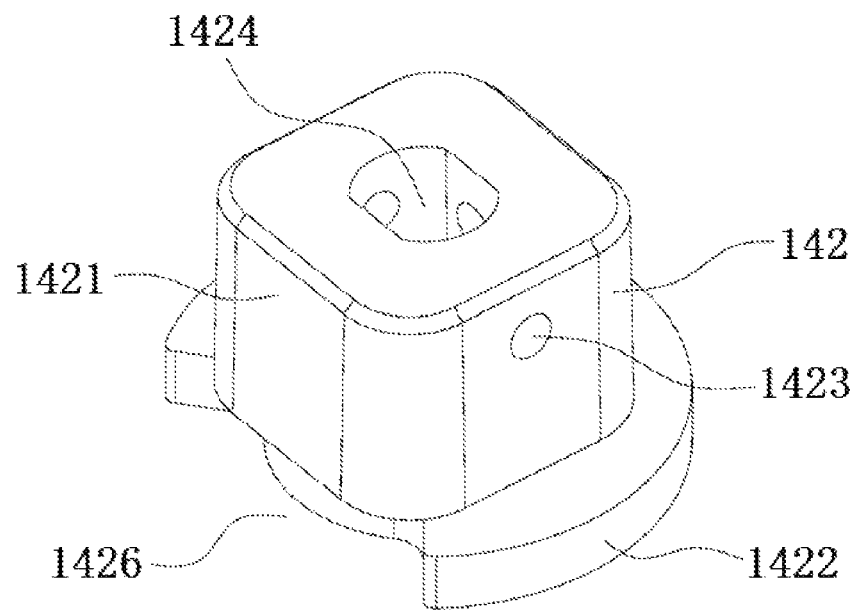
FIG. 32 is a perspective view of a nesting block in the present disclosure.

Referring again to FIG. 22, FIG. 23, FIG. 24 and referring to FIG. 31 and FIG. 32, in this embodiment, the upright rod 1411 of the steering connector member 141 passes through the upright tube 1402 of the fastening seat 140, a nesting block 142 sleeved on the upright rod 1411 is provided at a bottom end of the second tube 1201. The nesting block 142 comprises a fixing block 1421 mounted in a tubular space of the second tube 1201, and a mounting base 1422 fixedly connected to the fixing block 1421 and cooperating on a bottom end face of the second tube 1201. The fixing block 1421 has a quadrangle cross-section that matches the hollow tubular space of the second tube 1201, thereby preventing any rotation of the second tube 1201 relative to the nesting block 142, so that the second tube 1201 can rotate the nesting block 142 synchronously. The fixing block 1421 of the nesting block 142 is mounted in the tubular space of the second tube 1201, and the fixing block 1421 and a tube wall of the second tube 1201 are provided with screw holes 1423 for a threaded connection, the nesting block 142 is fixedly connected to the second tube 1201 by a screw bolt, which increases the mounting firmness between the nesting block 142 and the second tube 1201, and can also further improve the rotation synchronism of the nesting block 142 and the second tube 1201. The size of the fixing block 1421 is smaller than the mounting base 1422, the mounting base 1422 has a circular cross-section and matches the outer edge of the second tube 1201, and when the fixing block 1421 is inserted in the tubular space of the second tube 1201, the bottom end face of the second tube 1201 abuts the mounting base 1422, thereby increasing the mounting reliability between the nesting block 142 and the second tube 1201. The shaft body of the upright rod 1411 nested in the nesting block 142 is a flat shaft body 1412, and the nesting block 142 has an elongated flat hole 1424 cooperating with the flat shaft body 1412, and the cooperation between the flat shaft body 1412 and the elongated flat hole 1424 can prevent the upright rod 1411 from rotating relative to the nesting block 142, so that the nesting block 142 can rotate the upright rod 1411 synchronously to steer the front wheel 111. The flat shaft body 1412 of the upright rod 1411 protrudes out of the fixing block 1421 and extends upward, the extending end of the flat shaft body 1412 has external thread and is in a threaded connection with a screw nut 143, the nesting block 142 is fastened on the flat shaft body 1412 of the upright rod 1411 by the screw nut 143 and a shaft shoulder 1413, so that the upright rod 1411 is fixedly connected to the nesting block 142. The upright rod 1411 of the steering connector member 141 is fixedly connected to the nesting block 142, and the nesting block 142 is fixedly connected to the second tube 1201, and as a result, the steering connector member 141 is fixedly connected to the steering rod 120, so that the steering rod 120 is easy to be mounted by means of the steering connector member 141.

Referring to FIG. 14, FIG. 20, FIG. 22 and FIG. 27, a fixing bush 125 sleeved on an exterior of the second tube 1201 is provided at the top end of the second tube 1201, and the fixing bush 125 is mounted on the first connection plate 131 of the ring frame 103 (the top wall of the box body). The fixing bush 125 abuts the tube bush 123 nested on the top end of the second tube 1201, and in combination with the wheel fork, the mounting of the second tube 1201 is facilitated. The second tube 1201 of the steering rod 120 is mounted on the box body 101 by means of the upright rod 1411 of the wheel fork, and the mounting thereof is assisted by the fixing bush 125, so that a simple structure is achieved and the mounting speed of the steering device 102 is increased.

Referring to FIG. 31, it should be noted that, the nesting block 142 is sleeved on the flat shaft body 1412 of the upright rod 1411, the shaft shoulder 1413 of the upright rod 1411 constrains downward axial movement of the nesting block 142, and the screw nut 143 in a threaded connection with the flat shaft body 1412 constrains upward axial movement of the nesting block 142. In order to further constrain downward axial movement of the nesting block 142 relative to the upright rod 1411, a gasket 145 is provided between the mounting base 1422 of the nesting block 142 and the fastening seat 140 mounted with the steering connector member 141, the gasket 145 is sleeved on a periphery of the upright rod 1411 to cushion and raise the spacing distance between the mounting base 1422 and the fastening seat 140, the gasket 145 in cooperation with the shaft shoulder 1413 of the upright rod 1411 can together constrain downward axial movement of the nesting block 142 and can eliminate any adverse influence of caused by lathe machining accuracy of the height of the shaft shoulder 1413. That is to say, if the height of the shaft shoulder 1413 has a downward deviation, the nesting block 142 would move axially downward relative to the upright rod 1411, then, at this time, the downward axial movement of the nesting block 142 can also be constrained by only the gasket 145. In this embodiment, when the shaft shoulder 1413 of the upright rod 1411 is about to abut the nesting block 142, as the edge of the elongated flat hole 1424 has a chamfer 1425, contact of the nesting block 142 with the shaft shoulder 1413 of the upright rod 1411 is avoided, and the gasket 145 by itself constrains the downward axial movement of the nesting block 142, so that the mounting height of the steering device 102 is restricted. Of course, in other embodiments, the gasket 145 may be replaced by a compression spring, such a compression spring not only can constrain the downward axial movement of the nesting block 142, but also can bring a buffering function to the steering handle 121, thereby improving the comfort level when gripping the steering handle 121.

Figure 33:
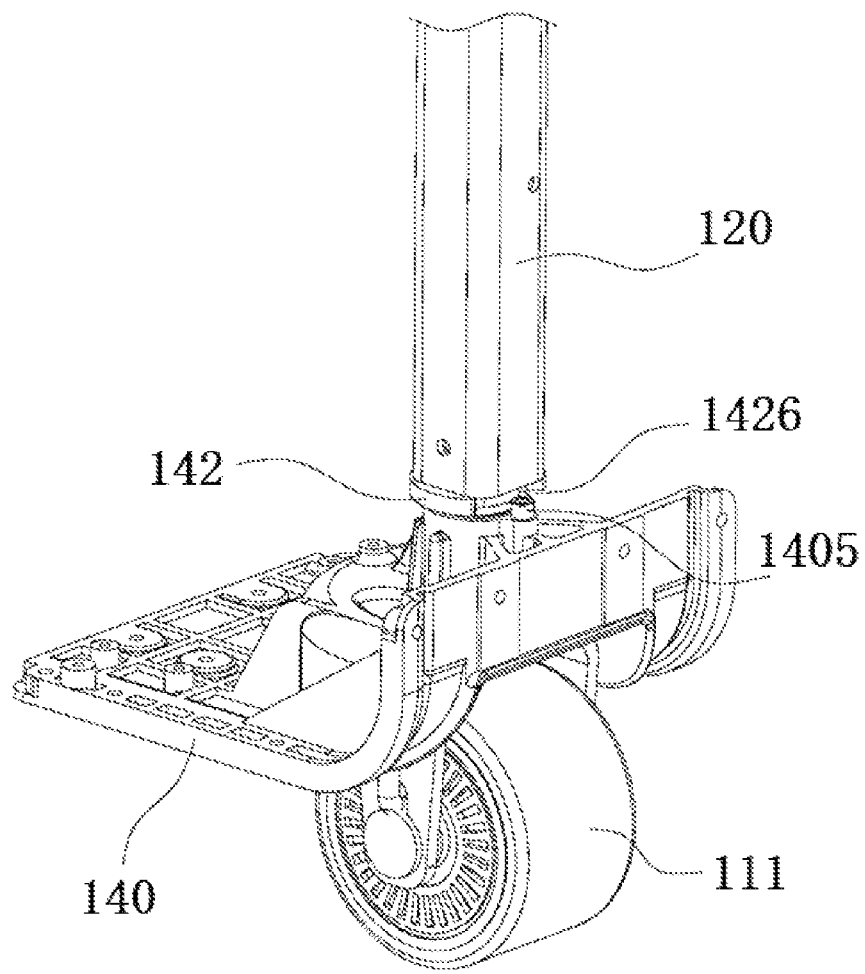
FIG. 33 is a perspective view of the steering connector member connected to the fastening seat and the second tube.

Referring to FIG. 31, FIG. 31 and FIG. 33, in this embodiment, the steering connector member 141, the nesting block 142 and the steering rod 120 rotate around the same axis. The steering rod 120 is provided with a turn-limiting slide slot 1426 for limiting the turning of the steering rod 120 around the axis thereof, and the upright tube 1402 is provided with a turn-limiting member 1405 extending into the turn-limiting slide slot 1426. The turn-limiting slide slot 1426 is provided on an outer edge of the mounting base 1422 of the nesting block 142 and has a curved shape. The turn-limiting member 1405 is a screw bolt fixedly connected on the upright tube 1402 with its screw cap situated in the turn-limiting slide slot 1426. When a user turns the steering rod 120, the turn-limiting member 1405 can constrain the turning degree of the steering rod 120, thereby preventing tumbling of the electric luggage box caused by too large a steering angle during fast running.

Figure 34:
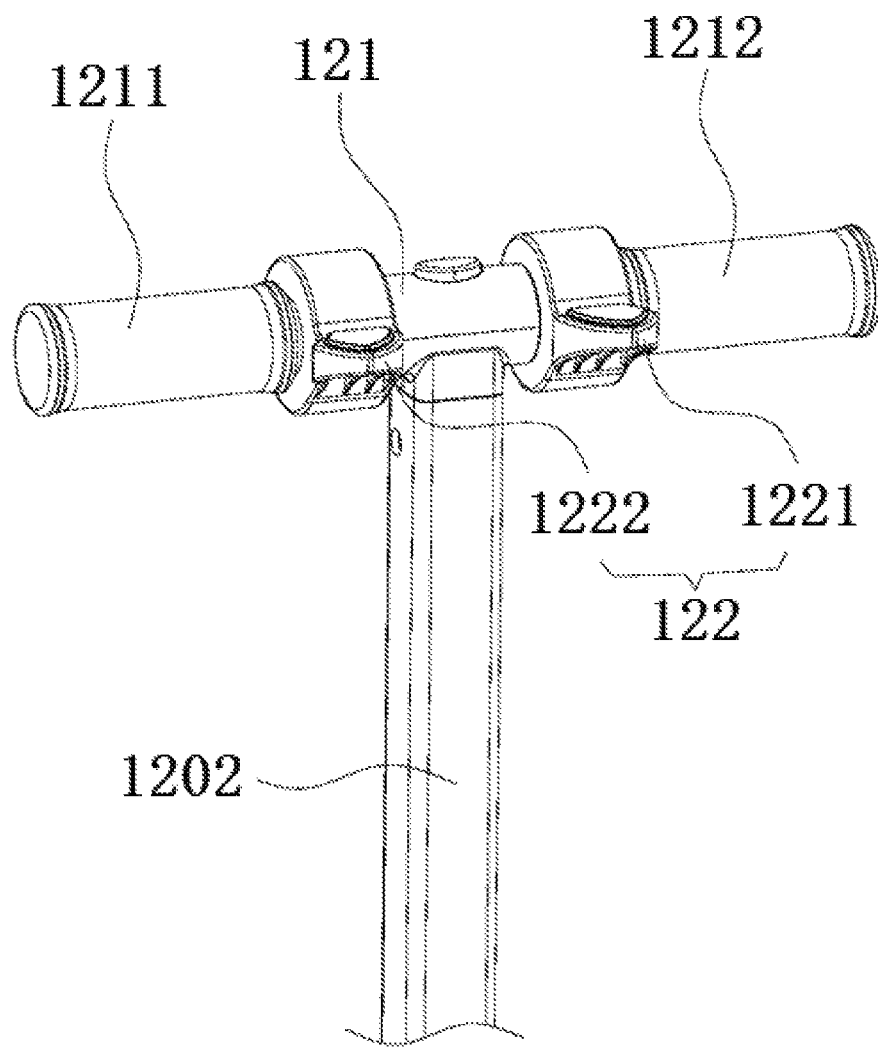
FIG. 34 is a schematic view of a steering handle in the present disclosure.

Referring to FIG. 34, in this embodiment, the steering handle 121 is mounted with a left grip 1211, a right grip 1212 and the running controller 122. The running controller 122 comprises a speed-regulating knob 1221 mounted on the right side of the steering handle 121 and a braking knob 1222 mounted on the left side of the steering handle 121. The speed-regulating knob 1221 is adjacent to the right grip 1212, and the braking knob 1222 is adjacent to the left grip 1211. The speed-regulating knob 1221 and the braking knob 1222 can be rotated circumferentially relative to the steering handle 121. The speed-regulating knob 1221 and the braking knob 1222 both have a force-applying part to be pressed or dialed by a thumb. The speed-regulating knob 1221 and the braking knob 1222 are both connected to the control module 113 by conductive wires. When the user operates the speed-regulating knob 1221 and the braking knob 1222, his/her palms of both hands respectively grip the right grip 1212 and the left grip 1211, and the corresponding thumbs can be used to adjust the rotation positions of the respective force-applying parts relative to the steering handle 121, so that the speed adjusting and electronic braking of the electric luggage box can be realized. The speed regulator of the speed-regulating knob 1221 is a potentiometer or a Hall sensor.

Figure 35:
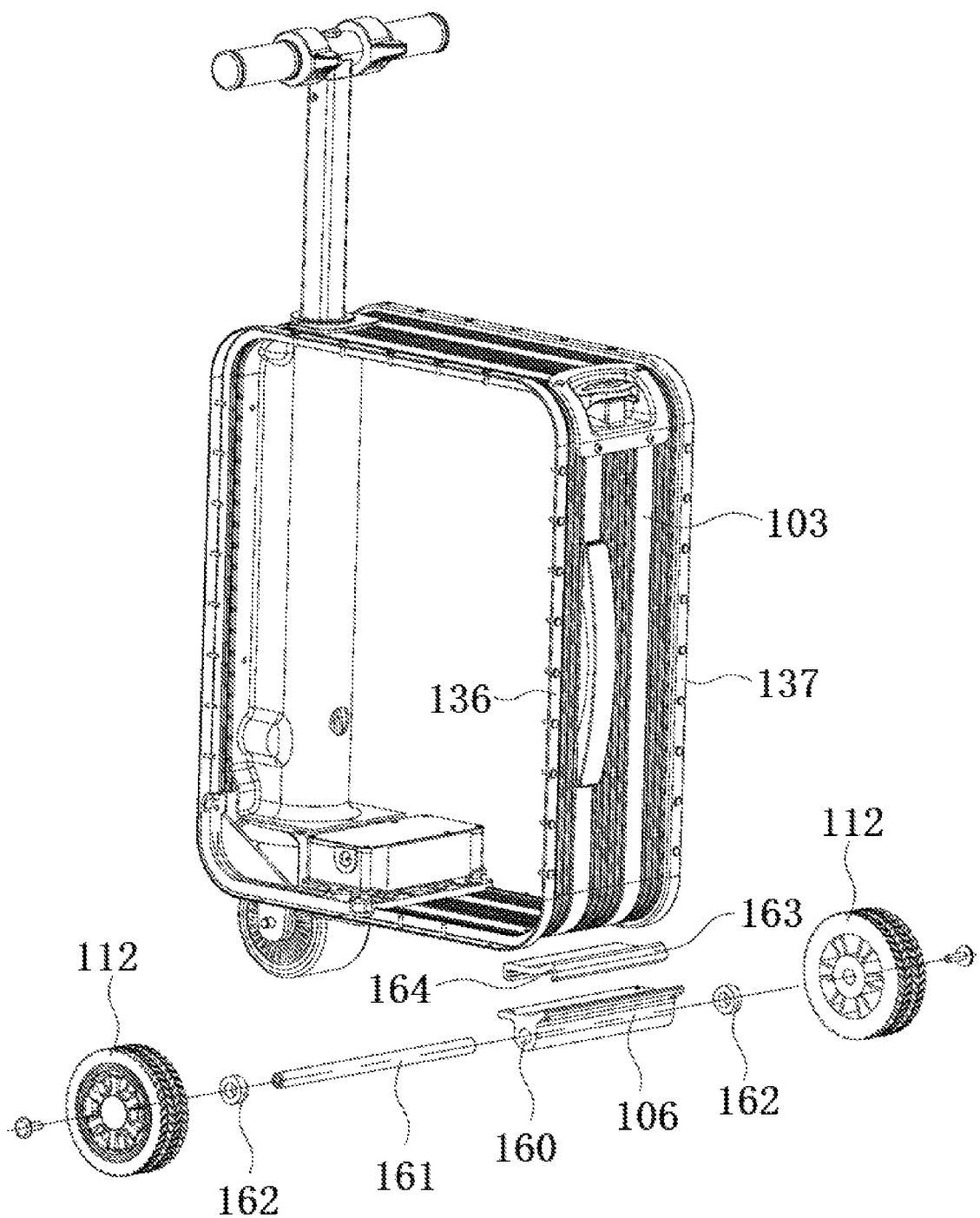
FIG. 35 is an explode view of the rear wheels connected to the ring frame.

Referring again to FIG. 13, FIG. 14, FIG. 17, FIG. 19 and referring to FIG. 35, in this embodiment, the rear wheel 112 is mounted at the bottom of the ring frame 103 and situated on a rear end portion of the ring frame 103. There are two rear wheels 112, the two rear wheels 112 are mounted on the third connection plate 133 of the ring frame 103 (the bottom wall of the box body) by means of an axle fastening member 106. The axle fastening member 106 is fixedly connected to the ring frame 103 by fasteners. Both the first edge part 136 and the second edge part 137 of the ring frame 103 flare and protrude from the main body 135 of the ring frame 103. Two ends of the axle fastening member 106 are respectively fixedly connected to the first edge part 136 and the second edge part 137 by screw bolts. The axle fastening member 106 has an axle hole 160 for mounting a rear wheel axle 161, and the rear wheel axle 161 passes through the axle hole 160 and is fixedly connected to the axle fastening member 106. The two rear wheels 112 are rotatably connected on the rear wheel axle 161 by bearings 162, and are respectively situated on both sides of the axle fastening member 106. A support member 163 is provided between a middle part of the axle fastening member 106 and the main body 135 of the ring frame 103. The support member 163 has a clamping groove 164 extending in the longitudinal direction of the axle fastening member 106, and the support member 163 clamps on the axle fastening member 106 via the clamping groove 164 to prevent the support member 163 from being separated from the axle fastening member 106. The support member 163 is used to fill the gap between the middle part of the axle fastening member 106 and the main body 135 of the ring frame 103, thereby improving the aesthetic property of the box body 101. Of course, in other embodiments, the support member 163 may also serve as an assembling unit for mounting the axle fastening member 106, so as to realize secondary fixing of the axle fastening member 106 and increase the mounting firmness of the rear wheels 112.

Referring to FIG. 17 and FIG. 13, in this embodiment, the first cover 115 is mounted on the first edge part 136 of the ring frame 103, and the second cover 116 is mounted on the second edge part 137 of the ring frame 103. The first cover 115 or the second cover 116 has an opening 119 communicating with the accommodation space to facilitate placing luggage, and the opening 119 is provided with a case cover 107. The bottom portions of the first cover 115 and the second cover 116 both have tread parts 170 for a user to tread on. The recessed groove of each tread part 170 extends from the front end portion of the box body to the back end portion of the box body, and a height of the recessed groove at the front end portion of the box body is lower than a height of the recessed groove at the back end portion of the box body, so that it is easy for the user to thread on. The bottoms of the first cover 115 and the second cover 116 both have a notch avoiding part 171 for mounting the rear wheels 112, so as to reduce the protrusion of the rear wheels 112 from the lateral sides of the box body 101 and improve the aesthetic property of the electric luggage box. Of course, in a practical mounting scene, a situation of the rear wheels 112 slightly protruding from the lateral sides of the box body 101 is nor excluded. It should be noted that, when the electric luggage box in this embodiment is used as a boarding suitcase, the sum of the dimensions of the three sides of the electric luggage box is less than or equal to 1250 mm.

Referring again to FIG. 17 and FIG. 13, in this embodiment, the battery is a rechargeable battery or a dry cell, for example, a portable battery. The case cover 107 is provided with a hop-pocket for storing the battery, and the battery is detachably connected to the case cover 107, so as to facilitate fetching the battery. For example, the battery can be detached from the electric luggage box in security check before boarding an airplane, or the battery can be removed from the box body 101 to be recharged. A power switch 172 is provided on the box body 101 for switching on or switching off the electric luggage box. A USD charging port is provided on the box body 101, so that the battery can charge an electronic device such as a cellphone via the USD charging port. Driving lights are provided on the front side and/or the back side of the ring frame 103, as well as on the left and right sides of the box body 101, so as to improve the travelling safety of the electric luggage box. The fourth connection plate 134 of the ring frame 103 (the back wall of the box body) is provided with a lifting handle 173 by which a user can easily lift the electric luggage box. The rear part of the box body 101 is provide with the pull rod 114 for pushing or dragging the electric luggage box to move. The first connection plate 131 of the ring frame 103 (the top wall of the box body) is provided with an opening for the pull rod 114 to extend out of the box body 101. The user can manually push or pull the electric luggage box to move by using the pull rod 114, so that the electric luggage box is used like an ordinary luggage box.

Finally, it should be noted that, the above embodiments are merely intended to illustrate the present disclosure, rather than limiting the technical schemes described by the present disclosure. Therefore, although the Specification has described the present disclosure in detail with reference to the above embodiments, however, a person with ordinary skill in the art should understand that, various modifications or equivalent substitutions may still be made to the present disclosure; and any technical scheme and improvement thereof not departing from the gist and scope of the present disclosure should all be embraced in the scope of the Claims of the present disclosure.

The invention claimed is:

1. A telescopic rod, comprising:
a hollow first tube;
a second tube, wherein the second tube is sleeved outside the first tube and being slidable relatively to the first tube;
a positioning mechanism, configured to lock and unlock the first tube in position relative to the second tube;
a control member, configured to control the positioning mechanism to lock and unlock in position; and
a conductive wire passing through the first tube and the second tube;
wherein the positioning mechanism comprises:
a pushrod connected to the control member and movable in the first rube,
an abutment unit provided at a bottom end of the pushrod, and
a positioning unit adapted for being abutted by the abutment unit for locking and unlocking in position;
wherein the first tube has a limiting structure provided therein, for limiting a space for movement of the abutment unit; and
wherein the first tube is provided with a positioning seat for mounting the positioning unit, and a through-hole for the conductive wire to pass through is provided in the positioning seat.

2. The telescopic rod according to claim 1, wherein the limiting structure is a guide convex rib provided on an inner wall of the first tube and extending along a longitudinal direction of the first tube.

3. The telescopic rod according to claim 2, wherein two guide convex ribs are provided, with the space for movement of the abutment unit formed between the two guide convex ribs.

4. The telescopic rod according to claim 2, wherein the positioning mechanism also comprises a linkage unit mounted on a top end of the pushrod and connected to the control member, and both the linkage unit and the abutment unit are movable in the space for movement along the guide convex rib.

5. The telescopic rod according to claim 1, wherein the conductive wire extends outside the space for movement in the first tube.

6. The telescopic rod according to claim 1, wherein the positioning seat and a tube wall of the first tube have pin holes correspondingly disposed thereon, a U-shaped clamping band is provided on a periphery of the first tube, and fixing pins are provided on a wall of the U-shaped clamping band for inserting into the pin holes.

7. The telescopic rod according to claim 1, comprising a steering device, wherein a handle mounted on the first tube of the telescopic rod.

8. The telescopic rod according to claim 7, wherein the handle comprises a tube mounting part, a left grip and a right grip, the control member is an elastic button mounted on the tube mounting part, with a pressing end thereof protruding out of the tube mounting part.

9. An electric luggage box, comprising:
a ridable box body;
a front wheel and a rear wheel mounted on the box body; and
a telescopic rod according to claim 7, wherein the steering device is configured to steer the front wheel;
wherein, the box body has a bottom wall, a top wall, a front wall and a back wall, the front wall and the back wall respectively interconnect the top wall and the bottom wall, an accommodation space is formed between the top wall, the bottom wall, the front wall and the back wall, the bottom wall of the box body is provided with a fastening seat within the accommodation space for mounting the front wheel; the steering device is arranged to pass through the top wall and is connected to the front wheel.

10. The electric luggage box according to claim 9, wherein the handle is provided with a manipulation device communicationally connected to a controller mounted inside the box body, and the manipulation device is connected to the controller via a conductive wire passing through the first tube and the second tube.

11. The electric luggage box according to claim 9, wherein a steering connector member is mounted on the fastening seat for connecting to the front wheel, and the steering device is connected to the front wheel through the steering connector member.

12. The electric luggage box according to claim 11, wherein the steering connector member comprises an upright rod for steering the front wheel, the fastening seat comprises an upright tube sleeved outside the upright rod, and the upright rod is rotatably connected to the upright tube through a bearing.

13. The electric luggage box according to claim 12, wherein the telescopic rod of the steering device is fixedly connected to the upright rod of the steering connector member, the telescopic rod is provided with a turn-limiting slide slot for limiting the turn around an axis of the telescopic rod, and the upright tube is provided with a turn-limiting member extending into the turn-limiting slide slot.

14. The electric luggage box according to claim 12, wherein the upright rod is arranged to pass through the upright tube, a nesting block sleeved on the upright rod is provided at a bottom end of the second tube, the nesting block is mounted in a tubular space of the second tube and fixedly connected to the second tube, and the upright rod is fixedly connected to the nesting block; a fixing bush sleeved on an exterior of the second tube is provided at a top end of the second tube, and the fixing bush is mounted on the top wall of the box body.

15. The electric luggage box according to claim 9, wherein the box body comprises a ring frame formed by the top wall, the front wall, the bottom wall and the back wall connected head-to-tail, a first cover and a second cover are respectively mounted on both lateral sides of the ring frame, and the fastening seat and the steering device are mounted on the ring frame.

16. The electric luggage box according to claim 15, wherein the ring frame is connected to an axle fastening member for mounting two rear wheels, and the two rear wheels are respectively mounted on both sides of the axle fastening member.

17. The electric luggage box according to claim 16, wherein the ring frame comprises a main body in the middle of the ring frame, and a first edge part and a second edge part on both sides of the main body, both the first edge part and the second edge part flare and protrude from the main body; two ends of the axle fastening member are respectively fixedly connected to the first edge part and the second edge part, and a support member is provided between a middle part of the axle fastening member and the main body.

18. The electric luggage box according to claim 17, wherein the main body comprises a straight segment and a waved segment arranged next to one another, the waved segment having a wall thickness less than that of the straight segment.

* * * * *